US009160962B2

(12) United States Patent
Hiramatsu et al.

(10) Patent No.: US 9,160,962 B2
(45) Date of Patent: Oct. 13, 2015

(54) COMMUNICATION APPARATUS

(71) Applicants: Takahiro Hiramatsu, Kanagawa (JP); Kiyoto Igarashi, Kanagawa (JP)

(72) Inventors: Takahiro Hiramatsu, Kanagawa (JP); Kiyoto Igarashi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 406 days.

(21) Appl. No.: 13/826,643

(22) Filed: Mar. 14, 2013

(65) Prior Publication Data

US 2013/0242207 A1 Sep. 19, 2013

(30) Foreign Application Priority Data

Mar. 16, 2012 (JP) .................................. 2012-059697
Nov. 28, 2012 (JP) .................................. 2012-259355

(51) Int. Cl.
*G03B 21/14* (2006.01)
*H04N 5/74* (2006.01)
*H04N 7/15* (2006.01)
*H04N 9/31* (2006.01)
*G03B 11/04* (2006.01)
*H04N 7/14* (2006.01)
*H04M 1/02* (2006.01)

(52) U.S. Cl.
CPC ............ *H04N 5/7475* (2013.01); *G03B 11/043* (2013.01); *G03B 21/145* (2013.01); *H04N 7/142* (2013.01); *H04N 7/15* (2013.01); *H04N 9/3141* (2013.01); *H04M 1/0272* (2013.01)

(58) Field of Classification Search
CPC ... G03B 21/145; G03B 21/30; H04M 1/0206; H04M 1/0208; H04M 1/0272
USPC ..................... 353/100, 101, 119, 39
See application file for complete search history.

(56) References Cited

U.S. PATENT DOCUMENTS

| | | | | |
|---|---|---|---|---|
| 7,862,185 B2 * | 1/2011 | Noba | | 353/119 |
| 7,874,683 B2 * | 1/2011 | Noba | | 353/39 |
| 8,023,029 B2 * | 9/2011 | Joseph | | 348/333.01 |
| 8,690,349 B2 * | 4/2014 | Hirata et al. | | 353/70 |
| 2012/0056973 A1 * | 3/2012 | Yano | | 348/14.08 |

FOREIGN PATENT DOCUMENTS

| | | |
|---|---|---|
| JP | 2002-262250 | 9/2002 |
| JP | 2009-186553 | 8/2009 |
| JP | 2011-244080 | 12/2011 |
| JP | 2012-235264 | 11/2012 |

* cited by examiner

*Primary Examiner* — William C Dowling
(74) *Attorney, Agent, or Firm* — Oblon, McClelland, Maier & Neustadt, L.L.P.

(57) ABSTRACT

A communication apparatus is used to share information via a communication network. The communication apparatus includes: a housing; a moving unit provided to be movable relatively with respect to the housing; a light projecting unit that projects light modulated based on image information, is provided in one of the housing or the moving unit, and includes a projector lens; and an image input unit that is to input an image, is provided in the other of the housing or the moving unit, and includes an image capturing lens. The moving unit is capable of moving relatively with respect to the housing between a covering position at which the projector lens and the image capturing lens are covered and an exposing position at which the projector lens and the image capturing lens are exposed.

11 Claims, 25 Drawing Sheets

FIG.1
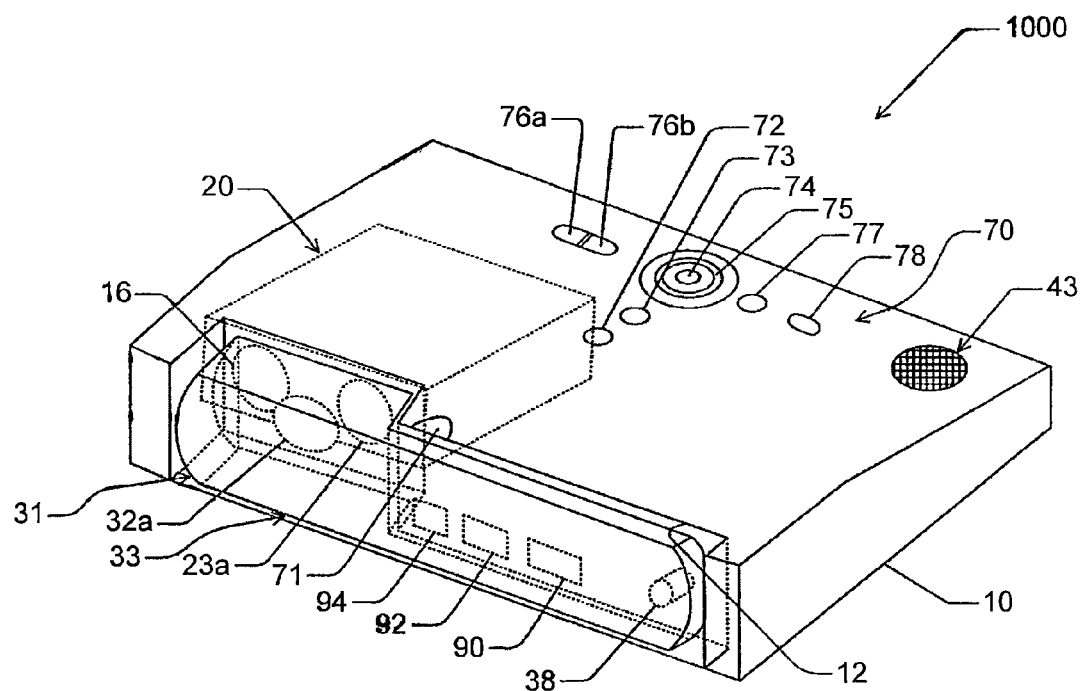
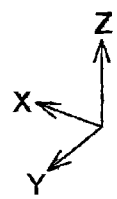

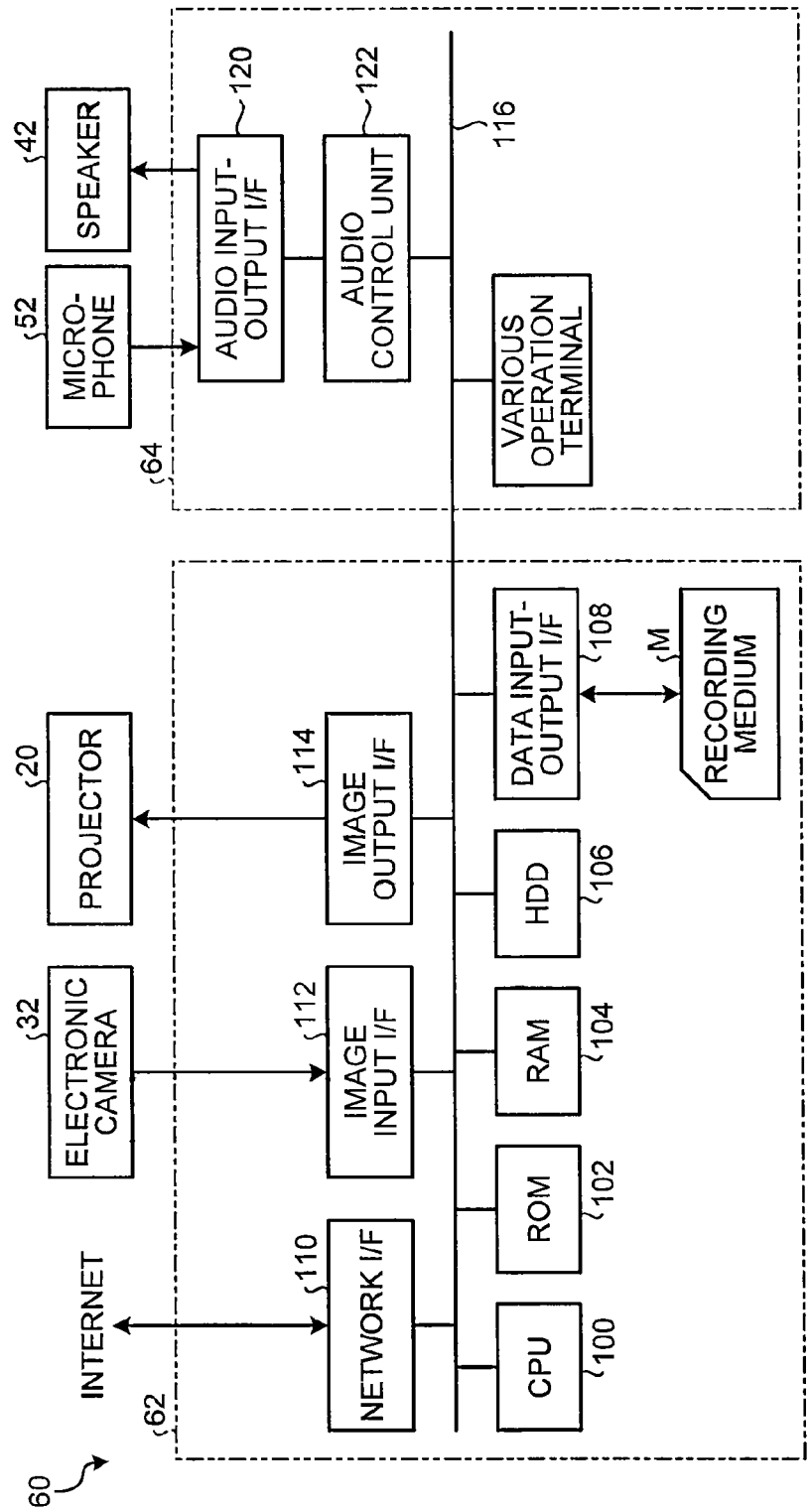

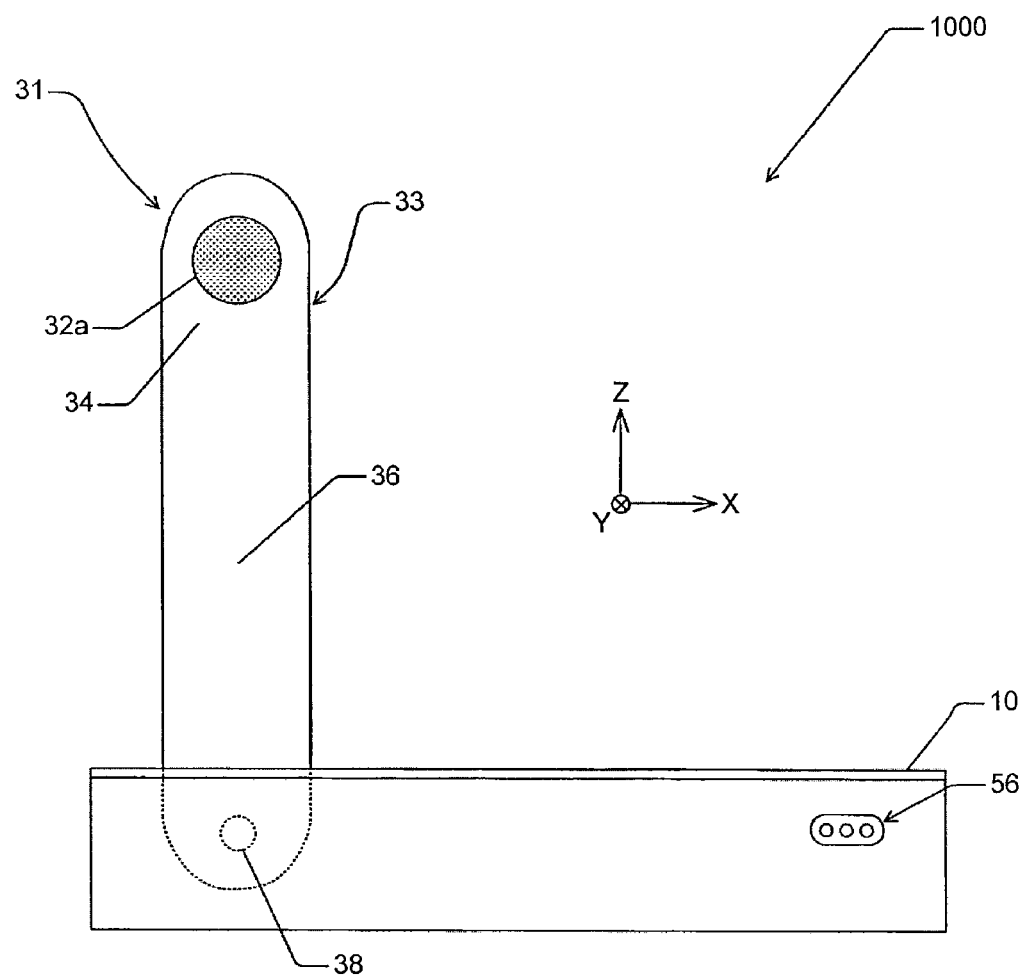

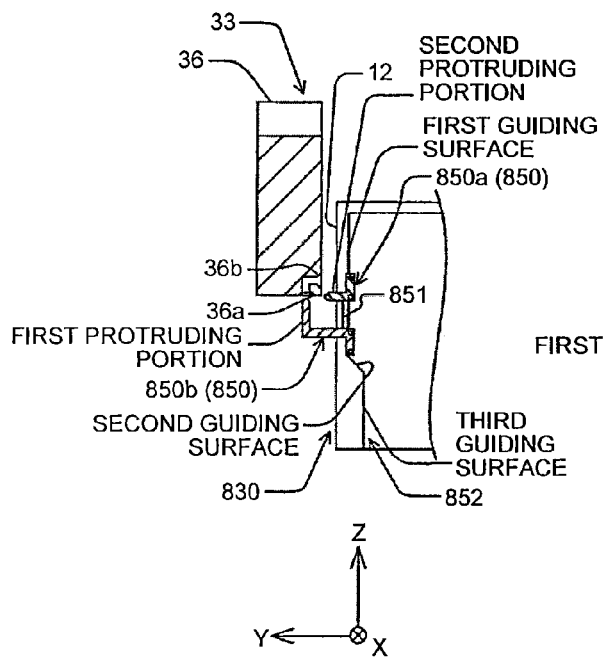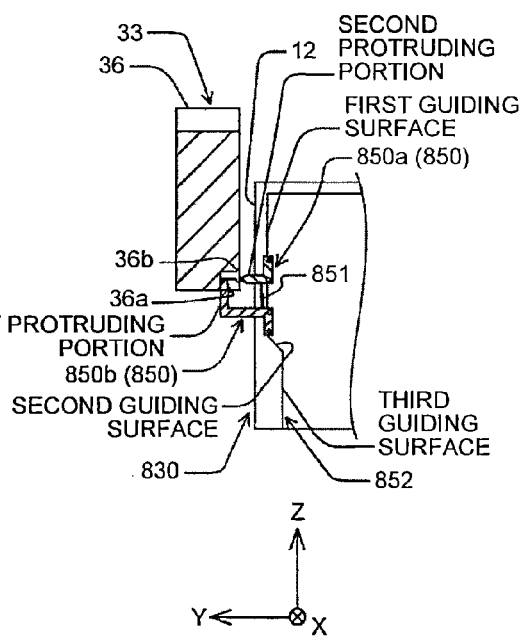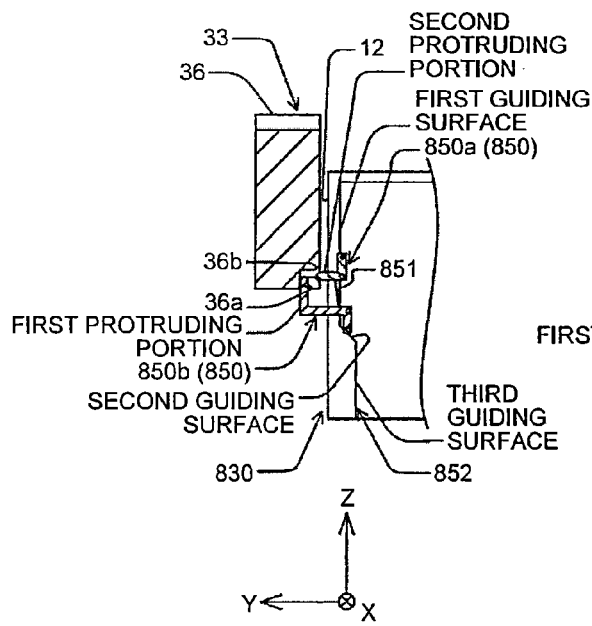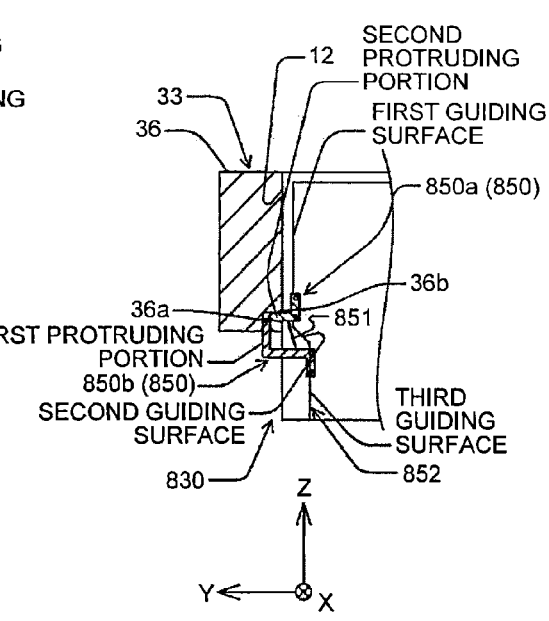

FIG.24
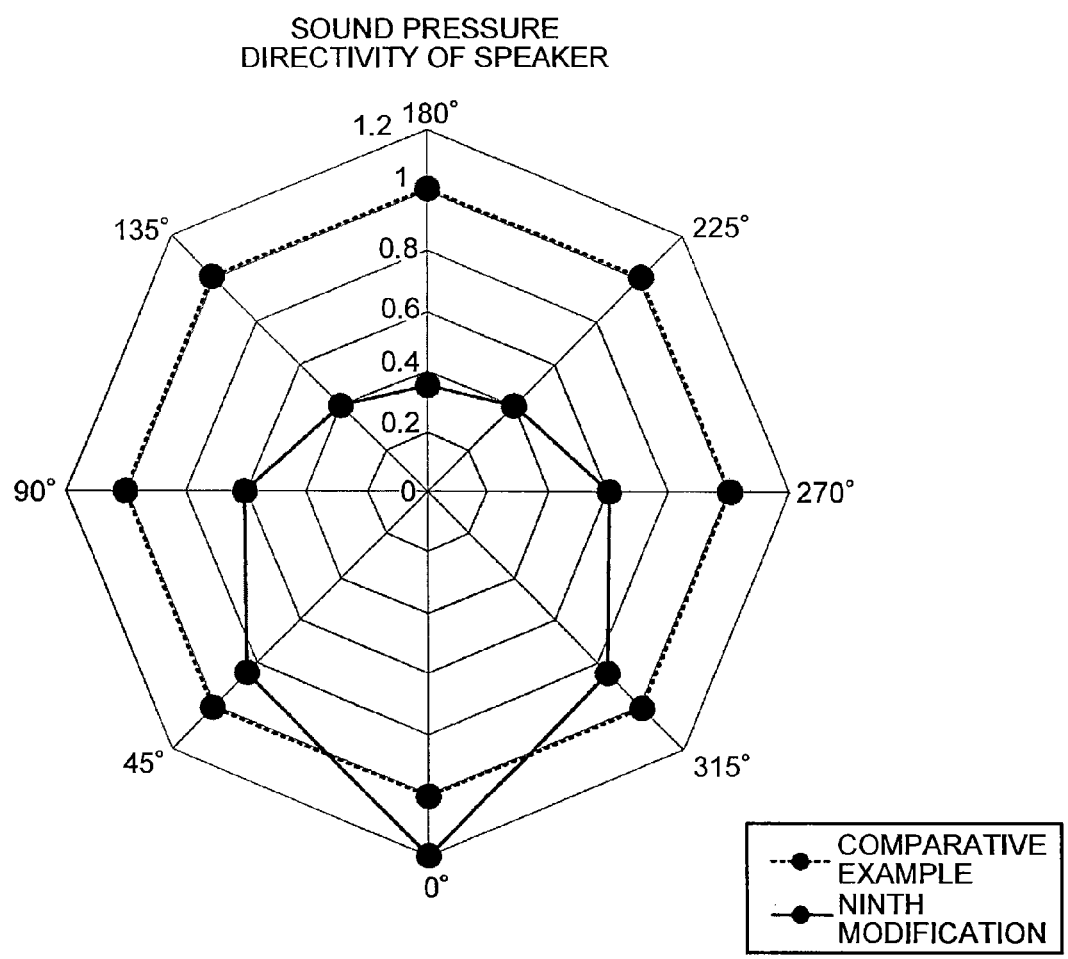
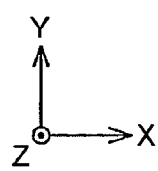

US 9,160,962 B2

COMMUNICATION APPARATUS

CROSS-REFERENCE TO RELATED APPLICATIONS

The present application claims priority to and incorporates by reference the entire contents of Japanese Patent Application No. 2012-059697 filed in Japan on Mar. 16, 2012 and Japanese Patent Application No. 2012-259355 filed in Japan on Nov. 28, 2012.

BACKGROUND OF THE INVENTION

1. Field of the Invention

The present invention relates to a communication apparatus, and more specifically to a communication apparatus used to share information in a conference and the like via a communication network.

2. Description of the Related Art

Conventionally, video conferences and audio conferences via a communication network (e.g., an Internet connection and a telephone line) have been conducted while sharing information among a plurality of groups with a plurality of communication apparatuses.

Japanese Patent Application Laid-open No. 2009-186553 and Japanese Patent Application Laid-open No. 2002-262250, for example, disclose such a communication apparatus provided with a projector including a projector lens that projects light modulated based on image information and with an image capturing device including an image capturing lens to input an image.

A projector is typically provided with a protective cap that protects a projector lens, and an image capturing device is provided with a protective cap that protects a camera lens.

Before use of a communication apparatus, it is necessary to remove protective caps from a projector lens and a camera lens. Furthermore, after use of the communication apparatus, it is necessary to attach the protective caps to the projector lens and the camera lens. In other words, it takes time to expose or cover the projector lens and the camera lens.

SUMMARY OF THE INVENTION

It is an object of the present invention to at least partially solve the problems in the conventional technology.

A communication apparatus is used to share information via a communication network. The communication apparatus includes: a housing; a moving unit provided to be movable relatively with respect to the housing; a light projecting unit that projects light modulated based on image information, is provided in one of the housing or the moving unit, and includes a projector lens; and an image input unit that is to input an image, is provided in the other of the housing or the moving unit, and includes an image capturing lens. The moving unit is capable of moving relatively with respect to the housing between a covering position at which the projector lens and the image capturing lens are covered and an exposing position at which the projector lens and the image capturing lens are exposed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a perspective view of a video conference apparatus according to an embodiment of the present invention illustrating a state where a rotating member is positioned at a covering position;

FIG. 4 is a block diagram of a configuration of control of the video conference apparatus;

FIG. 6 is a front view of the video conference apparatus illustrating a state where the rotating member is positioned at the exposing position;

FIGS. 20A to 20D are views for explaining a guiding mechanism of a video conference apparatus according to a seventh modification;

FIG. 24 is a graph of sound pressure directivity of speakers according to the ninth modification and a comparative example.

DETAILED DESCRIPTION OF THE PREFERRED EMBODIMENTS

An embodiment according to the present invention is described below with reference to FIG. 1 to FIG. 8. FIG. 1 is a schematic perspective view of an appearance of a video conference apparatus 1000 serving as an example of a communication apparatus according to the embodiment when not in use.

As illustrated in FIG. 1, the video conference apparatus 1000 has a thin nearly rectangular parallelepiped (nearly plate) shape as a whole when not in use. In FIG. 1, the video conference apparatus 1000 is placed on an upper surface (a placing surface) of a desk and a table, for example, in a manner parallel to a horizontal plane. In the description below, a longitudinal direction of the video conference apparatus is referred to as an X-axis direction, a direction orthogonal to the X-axis direction in the horizontal plane is referred to as a Y-axis direction, and a direction (a vertical direction) orthogonal to the X-axis direction and the Y-axis direction is referred to as a Z-axis direction.

Figure 2:
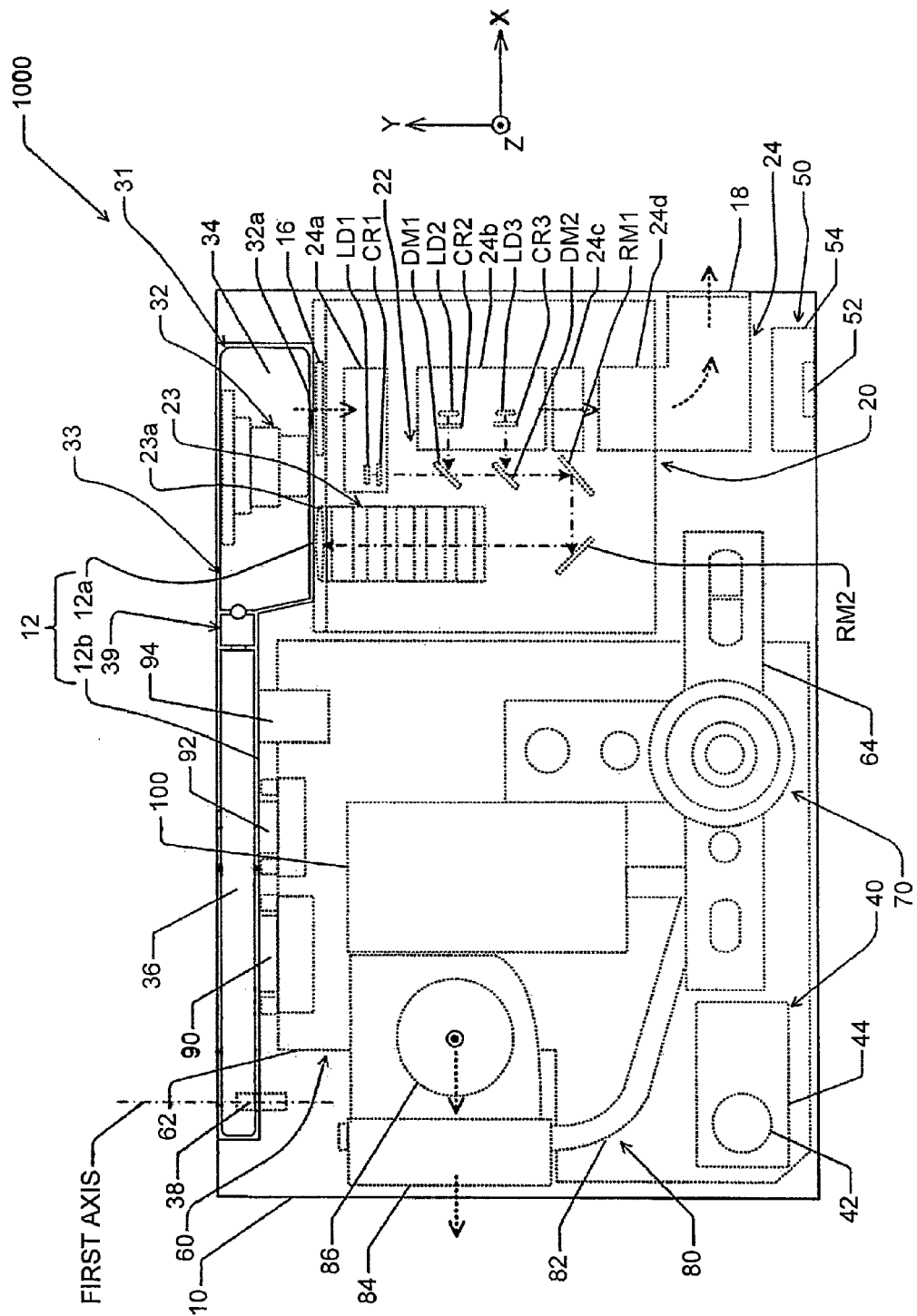
FIG. 2 is a view for explaining a configuration of the video conference apparatus.

FIG. 2 is a plan view (a top view) of the video conference apparatus 1000 of FIG. 1. As illustrated in FIG. 2, the video conference apparatus 1000 includes a housing 10, a projector 20 serving as a light projecting unit, an image input unit 31 including an electronic camera 32 serving as an image input unit, an audio output device 40 including a speaker 42, an audio input device 50 including a microphone 52, a control device 60, an operating unit 70, and a cooling device 80 that cools the control device 60.

The housing 10 is formed of a thin box-shaped hollow member. As illustrated in FIG. 2, the housing 10 has an A4-sized rectangular shape in a planar view, for example, and the thickness thereof is approximately 30 mm to 50 mm (refer to FIG. 3).

The housing 10 houses the projector 20, the audio output device 40, the audio input device 50, and the control device 60.

A stepped recess 12 is formed at the surface on the positive side in the Y-axis direction of the housing 10. The stepped recess 12 opens on the positive side in the Y-axis direction and the positive side in the Z-axis direction and extends along nearly the whole area in the X-axis direction, for example. The stepped recess 12 can house the image input unit 31. The stepped recess 12 is formed of a large-depth recess 12a that is positioned on the positive side in the X-axis direction and has a larger depth in the Y-axis direction and a small-depth recess 12b that is positioned on the negative side in the X-axis direction and has a smaller depth in the Y-axis direction.

The control device 60 encodes or decodes audio data and image data and controls interactive communications of audio and an image over the Internet serving as a communication network.

As illustrated in FIG. 4, the control device 60 includes a main board 62 serving as a control board and a sub board 64 serving as an audio-processing and operating board.

The main board 62 is arranged on the negative side in the Y-axis direction with respect to the small-depth recess 12b.

The main board 62 is equipped with components of a central processing unit (CPU) 100, a read-only memory (ROM) 102, a random access memory (RAM) 104, a hard disk drive (HDD) 106 (a storage or a recording device), a data input-output interface (I/F) 108, a network I/F 110, an image input I/F 112, and an image output I/F 114. These components are connected to one another in an interactively communicable manner via a bus line 116, such as an address bus and a data bus. The image data described above is data of a moving image or an intermittent image (still images displayed at constant time intervals).

An image input terminal 90, an image output terminal 92, and a local area network (LAN) terminal 94 serving as connectors are mounted on the end on the positive side in the Y-axis direction of the main board 62 in a manner aligned along the X-axis direction. A plurality of universal serial bus (USB) terminals are mounted on the end on the negative side in the Y-axis direction of the main board 62 in a manner aligned along the X-axis direction. A power jack is embedded in the side surface on the negative side in the X-axis direction of the housing 10.

The surface defining the small-depth recess 12b on the negative side in the Y-axis direction has three openings at positions corresponding to the image input terminal 90, the image output terminal 92, and the LAN terminal 94 in a manner aligned along the X-axis direction. A cable corresponding to each of the terminals can be attached thereto and detached therefrom through the corresponding opening.

The CPU 100 collectively controls the operations of the video conference apparatus 1000 based on a predetermined computer program (a computer program for a video conference apparatus). An explanation will be made later of a series of operations related to interactive communications of audio and an image over the Internet instructed by the CPU 100 in accordance with the computer program for a video conference apparatus.

The ROM 102 stores therein a computer program, such as an initial program loader (IPL), used to drive the CPU.

The RAM 104 is used as a work area for the CPU.

The HDD 106 stores therein various types of data, such as the computer program for a video conference apparatus, image data, and audio data. Instead of the HDD, a solid state drive (SSD) may be used, for example. The computer program for a video conference apparatus may be provided to be recorded in a computer-readable recording medium, such as a recording medium, as a file in an installable or executable format. Furthermore, the computer program for a video conference apparatus may be stored not in the HDD 106 but in the ROM 102. The HDD 106 controls reading or writing of various types of data from or to the HDD 106 under the control of the CPU 100.

The data input-output I/F controls reading or writing (storing) of data from or to a recording medium M, such as a flash memory, connected to the USB terminal described above. In addition, the data input-output I/F controls transmission of data displayed on a display of a personal computer (PC) serving as an information processing apparatus connected to one of the USB terminals to a video conference apparatus on the other end.

The recording medium M is attachable to and detachable from another USB terminal. As long as the recording medium M is a non-volatile memory that reads or writes data under the control of the CPU 100, it is not limited to a flash memory. Instead of a flash memory, an electrically erasable and programmable ROM (EEPROM) may be used, for example.

The network I/F 110 includes the LAN terminal 94 (e.g. an Ethernet (registered trademark) terminal) and inputs and outputs data (image data and audio data) over the Internet. The image input I/F 112 receives an image signal output from the electronic camera 32 as predetermined image data. The image input unit 31 including the electronic camera 32 will be described later in detail.

The image output I/F 114 converts image data into a predetermined analog or digital image signal receivable by the projector 20 and a display device, such as a liquid crystal display (LCD) monitor and an LCD television, connected to the image output terminal 92 and outputs the image signal. The image data includes a menu screen of an icon for operation, such as an address of a conference apparatus on the other end with which a video conference is to be conducted, adjustment of the image quality, and selection of an output signal, encoded image data among data received via the communication network, and image data input from the electronic camera 32. The CPU 100 decodes the encoded image data using a predetermined codec.

Examples of the predetermined image signal include an analog RGB signal (VGA), a component video signal, a high-definition multimedia interface (HDMI) signal, and a digital video interactive (DVI) signal.

The sub board 64 is equipped with components such as a plurality of operation terminals corresponding to a plurality of operation buttons, which will be described later, an audio input-output I/F 120, and an audio control unit 122. The operation terminals and the audio control unit 122 are connected to each other in an interactively communicable manner via the bus line 116 and to the components mounted on the main board 62 in an interactively communicable manner.

The audio input-output I/F 120 receives an audio signal input through the microphone 52 as predetermined audio data and transmits the audio data to the audio control unit 122. In addition, the audio input-output I/F 120 converts audio data received via the network I/F 110 and the audio control unit 122 into an audio signal reproducible by the speaker 42. The audio input device 50 including the microphone 52 and the audio output device 40 including the speaker 42 will be described later in detail.

The audio control unit 122 adjusts the volume of a sound output from the speaker 42 in association with operation of a pair of volume buttons 76a and 76b, which will be described later. In addition, the audio control unit 122 switches input/non-input of a sound from the microphone 52 in association with pressing (turning ON/OFF) of a microphone mute button 78, which will be described later.

In interactive communications performed with a video conference apparatus on the other end, an echo and feedback may possibly occur because a sound output from the speaker 42 is received by the microphone 52 to form a loop of a sound wave with the video conference apparatus on the other end. The audio control unit 122 has an echo cancelling function to suppress such an echo and feedback. In addition, the audio control unit 122 has a noise cancelling function to reduce noise, such as noise generated by air conditioning of a room and operating noise of a fan 86, which will be described later, received by the microphone 52.

The cooling device 80 releases heat generated by a heating element, such as the CPU 100 and a chipset, mounted on the main board 62 of the control device 60 to the outside of the housing 10, thereby cooling the heating element. As illustrated in FIG. 2, the cooling device 80 includes a heat pipe 82, a heat sink 84, and the fan 86 mounted horizontally. One end of the heat pipe 82 is connected to the main board 62, and the other end thereof is connected to the heat sink 84. The heat sink 84 is formed of a heat-releasing member including a number of fins made of a metal, for example. The heat generated in the main board 62 is transferred to the heat pipe 82 and the heat sink 84 sequentially and is released to the outside of the housing 10 from an outlet port formed on the side surface on the negative side in the X-axis direction of the housing 10. The fan 86 has a flow adjusting function and is arranged near the heat sink 84 on the positive side in the X-axis direction in the housing 10 such that the intake direction is the positive Z-axis direction. Therefore, the air sucked by the fan 86 through an inlet port formed on the surface on the negative side in the Z-axis direction of the housing 10 passes through the heat sink 84 and is discharged to the outside of the housing 10 from the outlet port. As a result, the heat-releasing effect of the heat sink 84 is further enhanced.

As illustrated in FIG. 2, the audio output device 40 is arranged at a corner on the negative side in the X-axis direction and the negative side in the Y-axis direction in the housing 10. In addition to the speaker 42, the audio output device 40 includes a speaker box 44 formed of a box-shaped hollow member. While a full-range round speaker is used as the speaker 42, another type of speaker may be used. The speaker 42 is connected to the audio input-output I/F 120 and outputs an audio signal transmitted from the audio input-output I/F 120 as audio. The speaker 42 is embedded in the speaker box 44 such that the audio output direction is nearly upward (including obliquely upward). An audio releasing port 43 is formed at a portion on the positive side in the Z-axis direction with respect to the speaker 42 on the upper surface of the housing 10. The audio releasing port 43 is composed of a plurality of through holes to release a sound output from the speaker 42 to the outside.

As illustrated in FIG. 2, the audio input device 50 is arranged at a corner on the positive side in the X-axis direction and the negative side in the Y-axis direction in the housing 10. In addition to the microphone 52, the audio input device 50 includes a holding member 54 that holds the microphone 52 in the housing 10. While a small omnidirectional microphone is used as the microphone 52, a directional microphone may be used. The microphone 52 is connected to the audio input-output I/F 120 and transmits received audio to the audio input-output I/F 120 as an audio signal. The microphone 52 is fixed to the end on the positive side in the X-axis direction of the side surface on the negative side in the Y-axis direction in the housing 10 via the holding member 54 such that the audio input direction is nearly the negative Y-axis direction. An audio receiving port 56 is formed at the end on the positive side in the X-axis direction of the side surface on the positive side in the Y-axis direction in the housing 10. The audio receiving port 56 is composed of a plurality of through holes to receive audio input through the microphone 52 from the outside.

As illustrated in FIG. 1, the operating unit 70 is embedded in the center in the X-axis direction on the surface on the positive side in the Z-axis direction in the housing 10 in a manner aligned along the Y-axis direction. The operating unit 70 includes a plurality of (e.g., four) operation buttons. These four operation buttons are an unlock button 71, which will be described later, a power button 72, a connection button 73, and a determination button 74 in order from the stepped recess 12 side. The power button 72 is used to turn ON/OFF the power to the video conference apparatus 1000. The connection button 73 is used to disconnect the Internet connection with a video conference apparatus on the other end. The determination button 74 is used to determine an item selected in a menu screen displayed on a screen of an LCD monitor, a personal computer (hereinafter, referred to as a PC), and an LCD television, for example, or on a screen displayed by the projector 20. A cursor 75 used to select an item in the menu screen is embedded near the outer circumference of the determination button 74 on the surface on the positive side in the Z-axis direction of the housing 10 in a manner surrounding the outer circumference of the determination button 74. Examples of the item selected and determined in the menu screen include an address of a video conference apparatus on the other end with which a video conference is to be conducted.

The pair of volume buttons 76a and 76b is embedded on the positive side in the X-axis direction with respect to the determination button 74 on the surface on the positive side in the Z-axis direction of the housing 10 in a manner adjacent to each other along the X-axis direction. The pair of volume buttons 76a and 76b is used to control the volume of a sound output from the speaker 42 (one is a button used to raise the volume and the other is a button used to lower the volume). A menu button 77 and the microphone mute button 78 are embedded on the negative side in the X-axis direction with respect to the determination button 74 on the surface on the positive side in the Z-axis direction of the housing 10 in order from the determination button 74 side. The menu button 77 is used to call up the menu screen on a screen of an LCD monitor or a screen, for example.

If the operation buttons and the cursor arranged on the surface on the positive side in the Z-axis direction of the housing 10 are each operated (pressed), the operation buttons and the cursor each engage with a corresponding member arranged under the operation buttons and the cursor. As a result, a desired function can be realized. Specifically, the operation buttons other than the unlock button 71 and the cursor are each arranged at a position corresponding to a corresponding operation terminal mounted on the sub board 64. When the buttons and the cursor are not pressed, the upper surfaces thereof are positioned nearly at the same level as that of the upper surface of the housing 10. Therefore, the video conference apparatus 1000 is excellent in uniformity of appearance, and the buttons and the cursor do not become a hindrance to carrying the video conference apparatus 1000.

Figure 3:
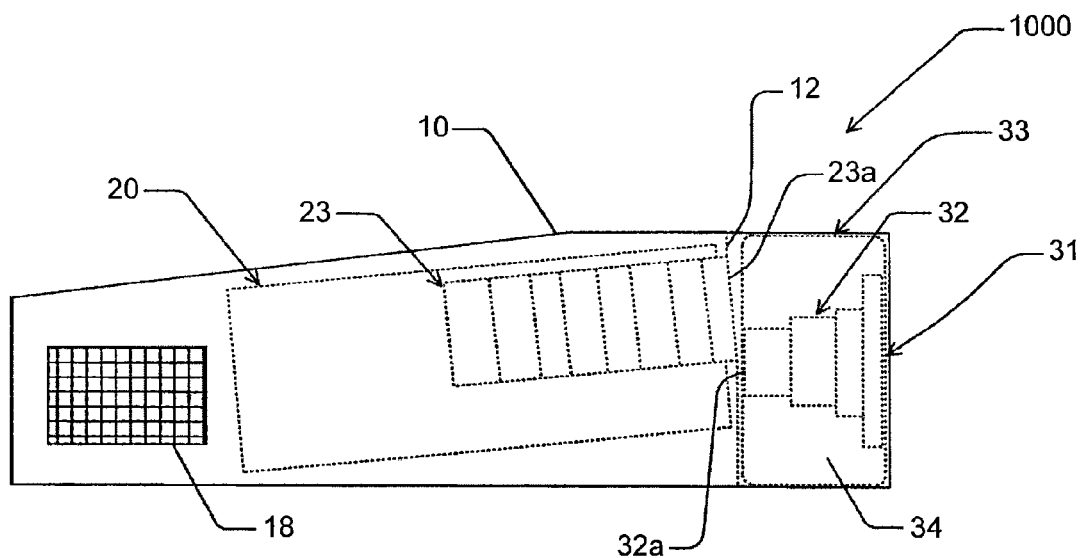
FIG. 3 is a side view of the video conference apparatus illustrating a state where the rotating member is positioned at the covering position.

As is clear from FIG. 3, a portion on the negative side in the Y-axis direction of the upper surface of the housing 10 is inclined by 3 degrees to 8 degrees (preferably, 4 degrees to 5 degrees) with respect to the XY plane (the lower surface in the housing 10) such that the portion on the negative side in the Y-axis direction is lower than the portion on the positive side in the Y-axis direction. In this case, especially when a user is present nearly on the negative side in the Y-axis direction with respect to the housing 10, the visibility and the operability of the operation buttons and the cursor become excellent.

As illustrated in FIG. 2, the image input unit 31 includes a camera housing 34, an arm 36, and a two-axis hinge 39 in addition to the electronic camera 32.

The electronic camera 32 inputs an image of a subject through an image capturing lens 32a, converts the image thus input to an electrical signal, and outputs the electrical signal to the image input I/F. The electronic camera 32 is housed in the camera housing 34 such that the image capturing lens 32a is fit into an opening formed in the camera housing 34. A wide-angle lens of a single focus with a small focal length is used as the image capturing lens 32a, for example.

The arm 36 is formed of a flat elongated hollow member parallel to the XZ plane. The base portion (the other end in the longitudinal direction) of the arm 36 is connected to the housing 10 via a one-axis hinge 38 provided in the housing 10. The arm 36 can rotate relatively with respect to the housing 10 about a first axis extending parallel to the Y-axis.

The camera housing 34 is fixed to one end of the arm 36 in the longitudinal direction via the two-axis hinge 39. The camera housing 34 can rotate relatively with respect to the arm 36 about each of a second axis extending in the longitudinal direction of the arm 36 and a third axis orthogonal to the second axis independently. The two-axis hinge 39 is not illustrated in the figures other than FIG. 2.

Hereinafter, a unit including the electronic camera 32, the camera housing 34, the arm 36, and the two-axis hinge 39 is referred to as the image input unit 31.

Figure 5A:
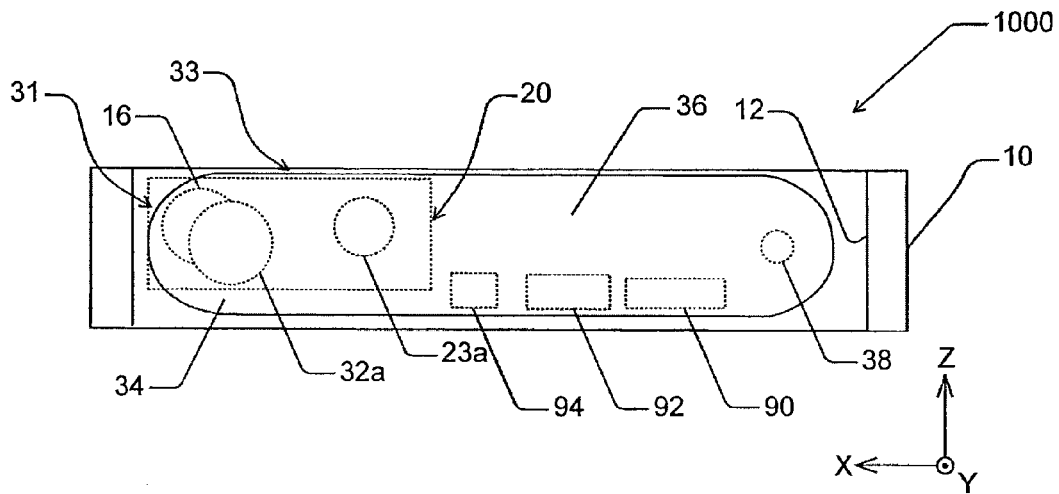
FIG. 5A is a back view of the video conference apparatus illustrating a state where the rotating member is positioned at the covering position.
Figure 5B:
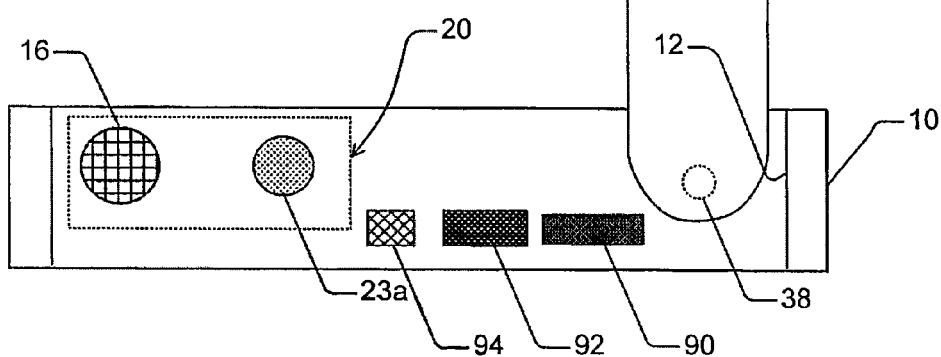
FIG. 5B is a back view of the video conference apparatus illustrating a state where the rotating member is positioned at an exposing position.

The image input unit 31 can rotate about the first axis between a housed position at which the image input unit 31 is housed in the stepped recess 12 and a protruding position at which a part of the image input unit 31 protrudes from the stepped recess 12 by the action of the one-axis hinge 38 (refer to FIG. 5B). If the rotation angle of the image input unit 31 with respect to the housing 10 about the first axis is assumed to be 0 degree when the image input unit 31 is positioned at the housed position, the rotation angle is mechanically restricted within a range of equal to or larger than 0 degree to equal to or smaller than 135 degrees, for example. The image input unit 31 is housed in the stepped recess 12 when the position of the camera housing 34 with respect to the arm 36 about the second and the third axes is at a position at which the image capturing lens 32a faces the negative side in the Y-axis direction (hereinafter, referred to as a reference position).

The image input unit 31 is biased from the housed position toward the protruding position by an elastic member provided to the one-axis hinge 38.

When rotating from the protruding position to the housed position, the image input unit 31 is mechanically locked at the housed position in the housing 10 by a lock mechanism, which is not illustrated, provided at a portion adjacent to the stepped recess 12 of the housing 10.

By operating (pressing) the unlock button 71 provided at the end on the positive side in the Y-axis direction on the surface on the positive side in the Z-axis direction of the housing 10 (a portion adjacent to the stepped recess 12), the lock of the image input unit 31 positioned at the housed position in the housing 10 caused by the lock mechanism is released. Subsequently, the action of the elastic member causes the image input unit 31 to rotate from the housed position toward the protruding position by a predetermined angle (e.g., 15 degrees).

In other words, the one-axis hinge 38 has a function to cause the image input unit 31 to pop up from the inside of the housing 10 by the action of the elastic member (a pop-up function).

The image input unit 31 is held at an arbitrary position in a predetermined range (e.g., a position at which the rotation angle is equal to or larger than 45 degrees to equal to or smaller than 135 degrees) about the first axis with respect to the housing 10 by an action of a holding torque generating mechanism provided in the one-axis hinge 38. By applying required moment about the third axis to the image input unit 31 thus held, the image input unit 31 rotates about the third axis.

Furthermore, in the image input unit 31, the camera housing 34 is held at an arbitrary position in a predetermined range about the first and the second axes with respect to the arm 36 by an action of a holding torque generating mechanism provided to the two-axis hinge 39. By applying required moment about the second and the third axes to the camera housing 34 thus held, the camera housing 34 rotates about the second and the third axes.

When the image input unit 31 positioned at the protruding position is rotated with respect to the housing 10 about the first axis, moment about the Y-axis, the X-axis, and the Z-axis, for example, acts on the housing 10 via the one-axis hinge 38. In this case, the main body may possibly wobble when the image input unit 31 is rotated with respect to the housing 10 depending on the center of gravity of a part of the video conference apparatus 1000 except for the image input unit 31 (hereinafter, referred to as a main body) and the weight ratio between the image input unit 31 and the main body.

To address this, in the present embodiment, the components are arranged in the housing 10 such that the center of gravity of the main body is positioned near the center of the housing 10, which is not illustrated, and the weight ratio of the image input unit 31 to the main body is 1:15, for example.

As a result, when the image input unit 31 is rotated with respect to the housing 10, the main body is prevented from wobbling. In other words, the image input unit 31 can be stably rotated with respect to the housing 10 about the first axis.

As illustrated in FIG. 1, when the image input unit 31 in the reference state is positioned at the housed position, at least a part of the surface on the negative side in the Z-axis direction of the image input unit 31 is placed on the surface defining the bottom of the stepped recess 12. Furthermore, as illustrated in FIG. 2, when the image input unit 31 is positioned at the housed position, the image input unit 31 nearly fits in the stepped recess 12 in the X-axis and the Y-axis directions.

As illustrated in FIG. 2, the projector 20 is arranged on the negative side in the Y-axis direction with respect to the large-depth recess 12a in the housing 10.

The projector 20 includes three laser diodes LD1, LD2, and LD3 serving as light sources, an optical system 22, a cooling system 24, and a light source driving circuit, for example.

The three laser diodes LD1 to LD3 are driven for modulation by the light source driving circuit based on image information supplied from the network I/F, the HDD 106, and the data input-output I/F, for example.

The laser diode LD1 is a red laser, for example, and is arranged so as to output red light in the negative Y-axis direction.

The laser diode LD2 is a blue laser, for example, and is arranged on the positive side in the X-axis direction and the negative side in the Y-axis direction with respect to the laser diode LD1 so as to output blue light in the negative X-axis direction.

The laser diode LD3 is a green laser, for example, and is arranged on the negative side in the Y-axis direction with respect to the laser diode LD2 so as to output green light in the negative X-axis direction.

The optical system 22 includes three collimator lenses CR1 to CR3, two dichroic mirrors DM1 and DM2, two reflecting mirrors RM1 and RM2, and a lens unit 23, for example.

The collimator lens CR1 is arranged on the negative side in the Y-axis direction with respect to the laser diode LD1, for example, and collimates the red light output from the laser diode LD1 into nearly parallel light.

The collimator lens CR2 is arranged on the negative side in the X-axis direction with respect to the laser diode LD2, for example, and collimates the blue light output from the laser diode LD2 into nearly parallel light.

The collimator lens CR3 is arranged on the negative side in the X-axis direction with respect to the laser diode LD3, for example, and collimates the green light output from the laser diode LD3 into nearly parallel light.

The dichroic mirrors DM1 and DM2 are each formed of a thin layer, such as a dielectric multilayer. The dichroic mirrors DM1 and DM2 reflect light of a specific wavelength and transmit light of wavelengths other than the specific wavelength.

The dichroic mirror DM1 is arranged on the negative side in the Y-axis direction with respect to the collimator lens CR1 and on the negative side in the X-axis direction with respect to the collimator lens CR2 in a manner inclined by 45 degrees with respect to the X-axis and the Y-axis, for example. The dichroic mirror DM1 transmits the red light passing through the collimator lens CR1 in the negative Y-axis direction and reflects the blue light passing through the collimator lens CR2 in the negative Y-axis direction.

The red light passing through the collimator lens CR1 and the blue light passing through the collimator lens CR2 are incident on the vicinity of the center of the dichroic mirror DM1.

The dichroic mirror DM2 is arranged on the negative side in the Y-axis direction with respect to the dichroic mirror DM1 and on the negative side in the X-axis direction with respect to the collimator lens CR3 in a manner inclined by 45 degrees with respect to the X-axis and the Y-axis, for example. The dichroic mirror DM2 transmits the red light and the blue light travelling via the dichroic mirror DM1 in the negative Y-axis direction and reflects the green light passing through the collimator lens CR3 in the negative Y-axis direction.

The red light and the blue light travelling via the dichroic mirror DM1 and the green light passing through the collimator lens CR3 are incident on the vicinity of the center of the dichroic mirror DM2.

The three rays of light (the red light, the blue light, and the green light) travelling via the dichroic mirror DM2 are combined into a ray of light and incident on the reflecting mirror RM1.

In this case, the color of the combined light (hereinafter, referred to as combined light CL) is represented by the balance of emission intensity of the three laser diodes LD1 to LD3.

The reflecting mirror RM1 is arranged on the negative side in the Y-axis direction with respect to the dichroic mirror DM2 in a manner inclined by 45 degrees, for example, with respect to the X-axis and the Y-axis. The reflecting mirror RM1 reflects the combined light from the dichroic mirror DM2 in the negative X-axis direction.

The reflecting mirror RM2 is arranged on the negative side in the X-axis direction with respect to the reflecting mirror RM1 in a manner inclined by 45 degrees, for example, with respect to the X-axis and the Y-axis. The reflecting mirror RM2 reflects the combined light from the reflecting mirror RM1 in the positive Y-axis direction.

The lens unit 23 includes a plurality of projector lenses arranged in a manner aligned in the Y-axis direction such that each of the optical axes is parallel to the Y-axis and is arranged on the positive side in the Y-axis direction with respect to the reflecting mirror RM2. The lens unit 23 is arranged so as to be upwardly inclined toward the positive side in the Y-axis direction with respect to the surface on the negative side in the Z-axis direction of the housing 10 (the XY plane). The projector lens arranged on the most positive side in the Y-axis direction among the projector lenses is hereinafter referred to as a projector lens 23*a*.

The projector lens 23*a* is fit into an opening (not illustrated) formed on the surface defining the large-depth recess 12*a* on the negative side in the Y-axis direction.

At least two projector lenses among the projector lenses other than the projector lens 23*a* arranged on the most positive side in the Y-axis direction can be moved relatively with respect to the optical-axis direction with a lens driving device or an adjusting lever. In other words, the projector 20 has an automatic focus position adjusting function (an automatic focus function) and a manual zoom adjusting function.

Therefore, the combined light reflected by the reflecting mirror RM2 is output in the positive Y-axis direction through the lens unit 23.

The cooling system 24 includes two heat sinks 24*a* and 24*b*, a fan 24*c*, and a duct 24*d*, for example.

An inlet port 16 composed of a plurality of through holes is formed at a portion on the positive side in the X-axis direction with respect to the opening into which the projector lens 23*a* is fit on the surface defining the large-depth recess 12*a* on the negative side in the Y-axis direction. An outlet port 18 composed of a plurality of through holes is formed near the end on the negative side in the Y-axis direction (near the portion on the positive side in the Y-axis direction with respect to the audio input device 50) on the side surface on the positive side in the X-axis direction of the housing 10. In this case, a gas flow path is formed between the inlet port 16 and the outlet port 18.

The heat sink 24*a* includes metal plates parallel to the XY plane and stacked in the Z-axis direction, for example. The heat sink 24*a* is in contact with the laser diode LD1 and is arranged such that at least a part of the heat sink 24*a* is positioned in the gas flow path. In this case, heat generated in the laser diode LD1 is released to the gas flow path via the heat sink 24*a*.

The heat sink 24*b* includes metal plates parallel to the XY plane and stacked in the Z-axis direction, for example. The heat sink 24*b* is in contact with the two laser diodes LD2 and LD3 and is arranged on the negative side in the Y-axis direction with respect to the heat sink 24*a* such that at least a part of the heat sink 24*b* is positioned in the gas flow path. In this case, heat generated in the two laser diodes LD2 and LD3 is released to the gas flow path via the heat sink 24*b*.

The fan 24*c* is arranged on the negative side in the Y-axis direction with respect to the heat sink 24*b* so as to be positioned in the gas flow path.

The duct 24*d* is formed of a tubular member in an L shape in a planar view. One end (an open end) of the L is positioned on the negative side in the Y-axis direction with respect to the fan 24*c*, and the other end (an open end) of the L is connected to the outlet port 18.

If the fan 24*c* is driven, air (a gas) flows into the housing 10 through the inlet port 16. The air then flows out of the housing 10 through the heat sinks 24*a* and 24*b*, the fan 24*c*, the duct 24*d*, and the outlet port 18. At this time, the heat released from the heat sinks 24*a* and 24*b* is discharged from the outlet port 18 together with the air. As a result, it is possible to cool the three laser diodes LD1 to LD3 efficiently and to obtain light with stable intensity.

If the image input unit 31 is positioned at the housed position as illustrated in FIG. 2, the camera housing 34 housing the electronic camera 32 is positioned in the large-depth recess 12*a*. In this case, the image capturing lens 32*a* and the camera housing 34 face the projector lens 23*a* and the inlet port 16 in proximity thereto. The image capturing lens 32*a*, the projector lens 23*a*, and the inlet port 16 are covered from the outside (refer to FIG. 5A).

Furthermore, if the image input unit 31 is positioned at the housed position, the arm 36 is positioned in the small-depth recess 12*b*. In this case, the arm 36 faces the image input terminal 90, the image output terminal 92, and the LAN terminal 94 in proximity thereto, and the three terminals are covered from the outside (refer to FIG. 2 and FIG. 5A).

Hereinafter, a part of the image input unit 31 other than the electronic camera 32 is referred to as a rotating member 33 (a moving unit), and the position of the rotating member 33 when the image input unit 31 is positioned at the housed position is referred to as a covering position.

In other words, if the video conference apparatus 1000 is not in use, the image capturing lens 32*a*, the projector lens 23*a*, the inlet port 16, the image input terminal 90, the image output terminal 92, and the LAN terminal 94 are covered and protected from the outside. Specifically, damage to the lenses and adhesion of foreign materials to the lenses are prevented, entrance of foreign materials into the inlet port 16 is prevented, and adhesion of foreign materials to the terminals is prevented.

By contrast, if the image input unit 31 is rotated with respect to the housing 10 about the first axis by a predetermined angle (e.g., 30 degrees to 135 degrees) to protrude from the inside of stepped recess 12, the image capturing lens 32*a*, the projector lens 23*a*, the inlet port 16, the image input terminal 90, the image output terminal 92, and the LAN terminal 94 are exposed to the outside (refer to FIG. 5B).

Hereinafter, the position of the rotating member 33 is referred to as an exposing position when the image input unit 31 is positioned to expose the image capturing lens 32*a*, the projector lens 23*a*, the inlet port 16, the image input terminal 90, the image output terminal 92, and the LAN terminal 94.

In other words, the rotating member 33 can be rotated relatively with respect to the housing 10 about the first axis between the covering position and the exposing position.

In this case, it is possible to input an image through the image capturing lens 32*a* and to project light through the projector lens 23*a*. It is also possible to cause a gas to flow into the housing 10 efficiently through the inlet port 16. It is also possible to connect, to the image input terminal 90, a cable connected to an external device (e.g., a device that can output image information, such as a digital versatile disk (DVD) player and a PC). It is also possible to connect, to the image output terminal 92, a cable connected to an external device (e.g., a device having a display function, such as an LCD monitor and an LCD television). It is also possible to connect, to the LAN terminal 94, a cable connected to the Internet.

In other words, it is possible to make the video conference apparatus 1000 available.

Figure 7:
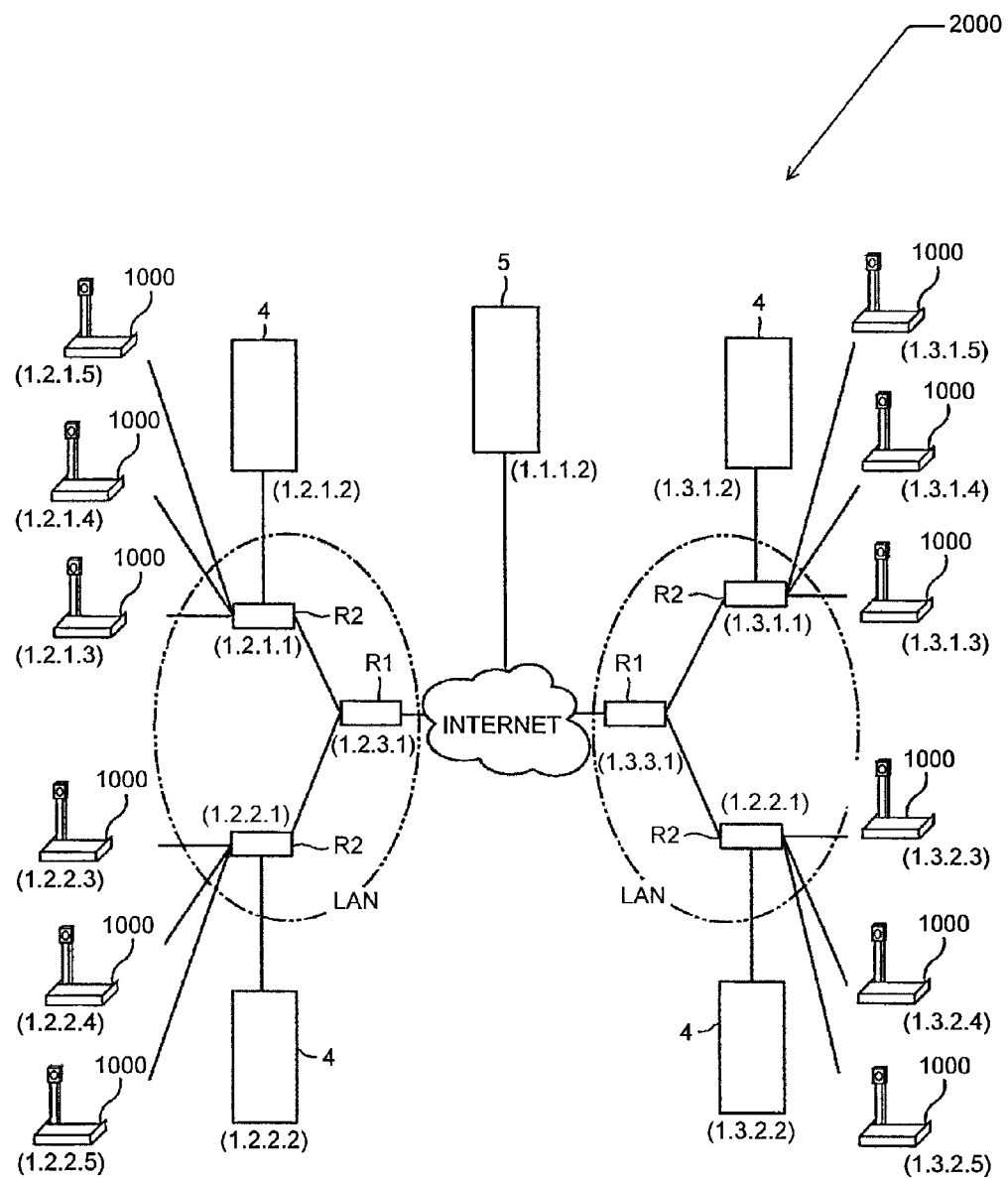
FIG. 7 is a schematic of a configuration of a conference system using the video conference apparatus.

A conference system 2000 using the video conference apparatus 1000 will now be described with reference to FIG. 7. As illustrated in FIG. 7, the conference system 2000 includes a LAN serving as a communication network having a plurality of (e.g., two) terminal routers R1 connected to the Internet and a plurality of routers R2 connected to each of the routers R1, a plurality of (e.g., three) video conference apparatuses 1000 and a relay apparatus 4 connected to each of the routers R2, and a communication management apparatus 5 connected to the Internet.

The relay apparatus 4 is a computer that realizes various functions in accordance with a predetermined control program. The relay apparatus 4 constantly monitors the quality (transmission rate) of the communication network to set image data at resolution suitable for the transmission rate. In other words, the relay apparatus 4 constantly detects whether a lag (delay) is caused between image data and audio data by influences of the state of the communication network and the processing status of the video conference apparatus 1000, for example, in the video conference apparatuses 1000 in interactive communications. If a lag is caused between audio data and image date, the relay apparatus 4 selects the resolution most suitable for the video conference apparatus 1000 in which the lag is caused among high-resolution image data, medium-resolution image data, and low-resolution image data and transmits the image data at the resolution thus selected to the video conference apparatus 1000 on the other end. Thus, even if the quality of the communication network deteriorates, a moving image can be transmitted without interruption. To eliminate the lag between image data and audio data, the relay apparatus 4 can change the frame rate and change the resolution and the frame rate with emphasis on the balance therebetween besides changing the resolution described above. Thus, the relay apparatus 4 constantly monitors the quality (transmission rate) of the communication network to perform management related to transfer of a moving image and audio, such as lag detection and specification of the resolution.

The communication management apparatus 5 is a computer that manages all the video conference apparatuses 1000 in accordance with a predetermined control program. The communication management apparatus 5 collectively manages the video conference apparatuses 1000 and the relay apparatuses 4 by: grasping the current operational status (e.g., in interactive communications, in a communication standby state, and in a de-energized state) of all the video conference apparatuses 1000; providing device authentication to the video conference apparatus 1000; supplying a destination list to the video conference apparatus 1000 to which the device authentication is provided; selecting the relay apparatus 4; and charging for the interactive communications between the video conference apparatuses 1000, for example.

An example of a video conference using the conference system 2000 configured as described above will now be explained. The video conference is conducted among a plurality of (e.g., 12) groups each composed of a plurality of members by using one video conference apparatus 1000 in each of the groups. Therefore, the explanation below applies to all the groups.

Figure 8:
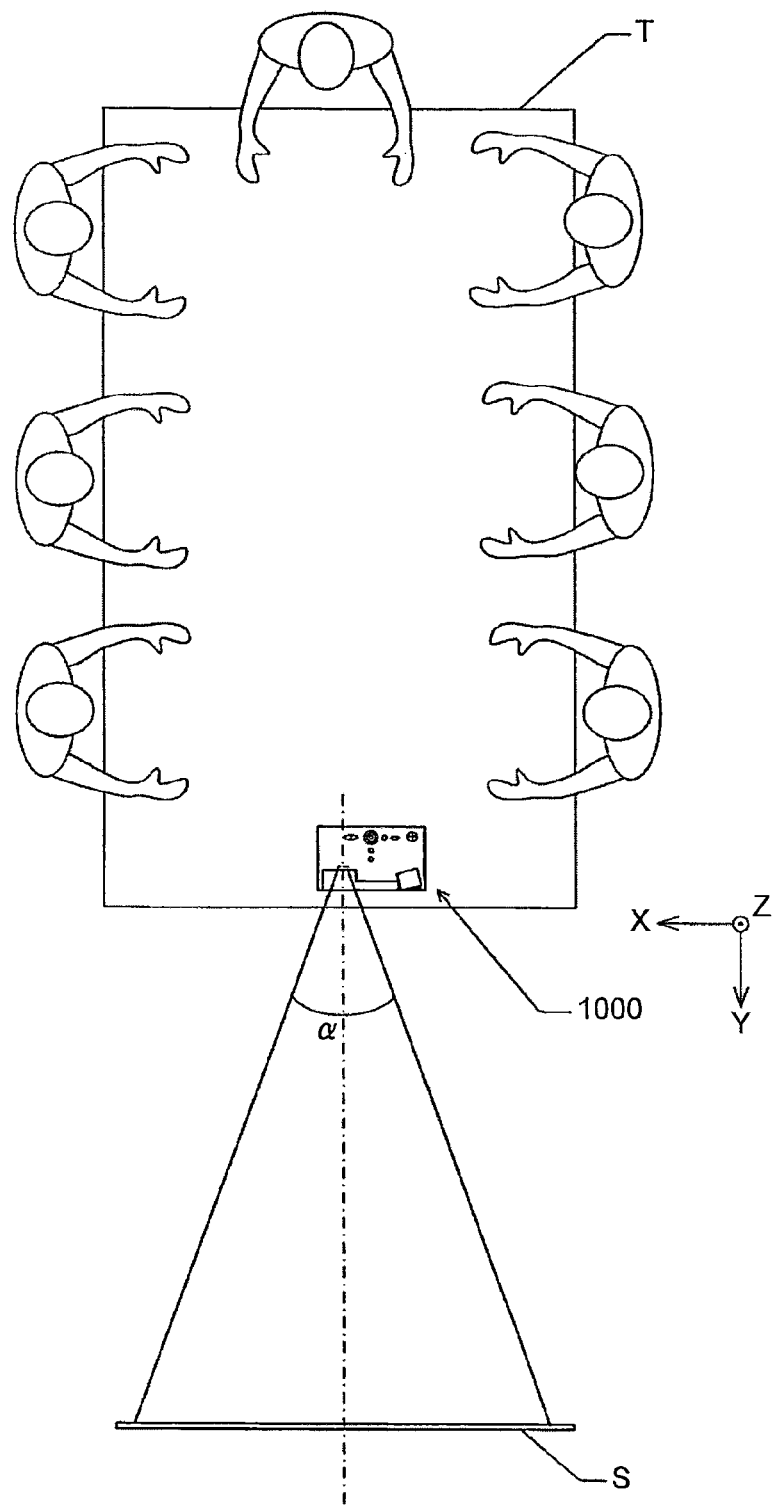
FIG. 8 is a view for explaining a video conference conducted by using the video conference apparatus.

As illustrated in FIG. 8, a plurality of (e.g., seven) members in a first group are seated on the positive side in the X-axis direction, the negative side in the X-axis direction, and the negative side in the Y-axis direction with respect to a table T in a manner facing the table T. The table T is a rectangular table in a planar view whose longitudinal direction is the Y-axis direction and is arranged in a conference room.

The video conference apparatus 1000 is placed at the end on the positive side in the Y-axis direction of the upper surface of the table T with the image input unit 31 positioned at the covering position (housed position). The video conference apparatus 1000 is placed such that the back surface thereof is positioned on the positive side in the Y-axis direction, that is, the image input unit 31 is positioned on the positive side in the Y-axis direction. At this time, because a part of the upper surface of the housing 10 is inclined so as to lower from the back side toward the front side in the video conference apparatus 1000, the direction of the video conference apparatus 1000 can be readily grasped. This facilitates turning of the video conference apparatus 1000 to a desired direction.

In the video conference apparatus 1000 placed on the table T as described above, a user (a member of the first group) who is present in an oblique direction of the negative side in the X-axis direction and the negative side in the Y-axis direction with respect to the video conference apparatus 1000 performs various operations via the operating unit 70, for example.

The user presses the unlock button 71 (refer to FIG. 1) to release the lock of the image input unit 31 in the housing 10. At this time, the pop-up function of the one-axis hinge 38 causes the image input unit 31 to rotate with respect to the housing 10 about the first axis and protrude from the stepped recess 12 by a predetermined amount.

Subsequently, the user manually rotates the image input unit 31 about the first axis until the total rotation angle becomes 90 degrees, for example, to position the image input unit 31 to the exposing position (refer to FIG. 5A and FIG. 5B). As a result, the image capturing lens 32a, the projector lens 23a, the inlet port 16, the image input terminal 90, the image output terminal 92, and the LAN terminal 94 are exposed.

At this time, the electronic camera 32 can capture an image of a subject, and the projector 20 can project an image onto a screen S arranged obliquely above the table T on the positive side in the Y-axis direction and the positive side in the Z-axis direction. A horizontal angle of view α of the projector 20 is set to 20 degrees to 40 degrees, for example. A cable corresponding to each of the image input terminal 90, the image output terminal 92, and the LAN terminal 94 can be connected thereto.

By manually rotating the camera housing 34 with respect to the arm 36 about the second and the third axes as appropriate, the user positions the electronic camera 32 at a position where the figures of all the members of the first group are in the image capturing view.

Furthermore, the user makes a wiring connection related to electricity and communications in the video conference apparatus 1000. Examples of the wiring connection include a connection between a terminal connected to the Internet and the LAN terminal 94 via a cable, a connection between the image output terminal 92 and a terminal connected to an external device (e.g., a device that can display an image, such as an LCD monitor and an LCD television) via a cable, a connection between the image input terminal 90 and a terminal connected to an external device (e.g., a device that can output image information, such as a DVD player and a PC) via a cable, and a connection between the power jack and a power supply via a cable.

Subsequently, the user presses the power button 72 (refer to FIG. 1) to start the video conference apparatus 1000. At this time, the projector 20 displays a menu screen on the screen S. The menu screen displays each item, such as various types of adjustment and start of a conference (start of interactive communications), as an icon and character information.

When the video conference apparatus 1000 is started, cooling of the control device 60 is started by the cooling device 80, and cooling in the projector 20 is started by the cooling system 24.

By operating the adjusting lever of the projector 20 as appropriate, the user makes the size of the screen displayed on the screen S an appropriate size (performs zoom adjustment).

Furthermore, the projector 20 automatically performs focus adjustment for an image to be displayed on the screen S by the automatic focus function described above.

The user operates the cursor 75 and the determination button 74 to select and determine the image setting mode of the projector 20 on the menu screen and displays the image setting mode on the screen S. Subsequently, the user operates the cursor 75 and the determination button 74 to select and determine values of various parameters in selection items of the image setting mode. Thus, the user adjusts the brightness and the contrast of the image to be displayed on the screen S depending on the brightness of the conference room, for example. The image setting mode has a selection item to perform the zoom adjustment manually with the lens driving device.

Subsequently, the user operates the cursor 75 to select an item related to start of a conference on the menu screen. The user then presses the determination button 74 to determine the start of the conference.

If the start of the conference is determined, a first video conference apparatus 1000 transmits a signal indicating the fact to the communication management apparatus 5 over the communication network (that is, the LAN and the Internet). At this time, the communication management apparatus 5 provides device authentication to the first video conference apparatus 1000. After providing the device authentication, the communication management apparatus 5 transmits a destination list indicating the current operational statuses of the other video conference apparatuses 1000 (video conference apparatuses 1000 registered in the communication management apparatus 5) other than the first video conference apparatus 1000 to the first video conference apparatus 1000. At this time, the first video conference apparatus 1000 displays the destination list on the screen S with the projector 20. The destination list is composed of icon display and character information with which intuitive operation can be performed and is updated as appropriate.

The user then operates the cursor 75 and the determination button 74 to select and determine a second video conference apparatus 1000 with which the user desires to conduct a video conference (interactive communications) from the destination list.

If the user selects and determines the second video conference apparatus 1000 with which the user desires to perform interactive communications from the other video conference apparatuses 1000 that are not de-energized in the destination list, the communication management apparatus 5 selects the most appropriate relay apparatus 4 from the relay apparatuses 4. Usually, a relay apparatus 4 physically closer to the first video conference apparatus 1000 is selected. If there is something wrong with the relay apparatus 4, however, another relay apparatus 4 is selected. If the Internet Protocol (IP) address of the first video conference apparatus 1000 is (1.2.1.5) as illustrated in FIG. 7, for example, a relay apparatus 4 with an IP address of (1.2.1.2) is selected. If the relay apparatus 4 is down, a relay apparatus 4 with an IP address of (1.2.2.2) is selected. The IP address is a unique IP address assigned to each individual video conference apparatus 1000 for convenience of explanation. (The IP address is represented by four numbers in a bracket in FIG. 7. The IP address of the communication management apparatus 5 is (1.1.1.2), for example.)

If the communication management apparatus 5 selects the relay apparatus 4, a request for interactive communications is promptly transmitted to the second video conference apparatus 1000 via the relay apparatus 4 based on the IP address. If the second video conference apparatus 1000 receives the request for interactive communications, the second video conference apparatus 1000 displays items related to acceptance and refusal of the request on the menu screen projected onto the screen S by the projector 20.

A member of a second group operates the cursor 75 and the determination button 74 of the second video conference apparatus 1000 to select and determine one of the items related to the acceptance and the refusal. If the item related to the acceptance is selected and determined, interactive communications are started between the first and the second video conference apparatuses 1000.

At this time, the relay apparatus 4 constantly monitors the quality (transmission rate) of the communication network as described above. If the quality of the communication network deteriorates, the relay apparatus 4 relays image data at resolution one level lower than the current resolution, relays image data with a lower frame rate, or relays image data at lower resolution with a lower frame rate. At the same time when the interactive communications are started between the video conference apparatuses 1000, the communication management apparatus 5 performs processing of charging for the use of the conference system 2000 according to the present embodiment, such as identification of the video conference apparatuses 1000 and measurement of communication time.

If the interactive communications are started between the first and the second video conference apparatuses 1000, the figures (image) of all the members of the first group input from the electronic camera 32 of the first video conference apparatus 1000 are transmitted to the second video conference apparatus 1000 of the second group on the other end over the Internet connection. The projector 20 connected to the second video conference apparatus 1000 then displays the image on the screen S. Furthermore, the figures (image) of all the members of the second group input from the electronic camera 32 of the second video conference apparatus 1000 are transmitted to the first video conference apparatus 1000 over the Internet connection. The projector 20 connected to the first video conference apparatus 1000 then displays the image on the screen S.

The CPU 100 of the first and the second video conference apparatuses 1000 encodes the image captured by the electronic camera 32 into image data of each image quality of high resolution (e.g., 640 pixels by 480 pixels), medium resolution (e.g., 320 pixels by 240 pixels), and low resolution (e.g., 160 pixels by 120 pixels) using a predetermined codec and outputs the image data thus encoded. The image data thus encoded is decodable into a moving image or an intermittent image (still images displayed at constant time intervals) in the first and the second video conference apparatuses 1000. Whether to decode the image data into a moving image or an intermittent image can be selected on the menu screen. Furthermore, it is possible to realize various types of image representation, such as a picture-in-picture function to synthesize a plurality of pieces of image data supplied from the video conference apparatuses 1000 of the other groups participating in the video conference and to simultaneously output the image data.

The microphone 52 of the first video conference apparatus 1000 receives audio of the first group. The audio thus received is transmitted to the second video conference apparatus 1000 over the Internet connection and is output from the speaker 42. By contrast, the microphone 52 of the second video conference apparatus 1000 receives audio of the second group. The audio thus received is transmitted to the first video conference apparatus 1000 over the Internet connection and is output from the speaker 42.

Before the video conference is started or while the video conference is being conducted, the user (a member of the first group) presses the pair of volume buttons 76a and 76b to adjust the volume of the sound output from the speaker 42 and presses the microphone mute button 78 to prevent the audio of the first group from being output to the second group on the other end as appropriate. Furthermore, the user presses the menu button 77 to call up the menu screen on the screen S as appropriate. The user then presses the cursor 75 and the determination button 74 to select and determine an item on the menu screen, whereby a desired function is performed.

As described above, the video conference by the interactive communications of an image and audio is conducted.

To change the second group on the other end, the user presses the connection button 73 to disconnect the Internet connection with the second video conference apparatus 1000 to which the first video conference apparatus 1000 is being connected. At this time, the menu screen is displayed on the screen S, and the destination list is displayed on the menu screen.

In the same manner as described above, the user operates the cursor 75 and the determination button 74 of the first video conference apparatus 1000 to select and determine a third video conference apparatus 1000 with which the user desires to conduct a video conference next. Furthermore, in the same manner as described above, if the third video conference apparatus 1000 thus selected and determined performs an operation of accepting interactive communications, the interactive communications are started between the first and the third video conference apparatuses 1000. Subsequently, the video conference is conducted in the same manner as described above.

After the video conference is finished, the user presses the power button 72 to stop power supply to the video conference apparatus 1000. By pressing the power button 72 in this manner, it is possible to shut down the video conference apparatus 1000 and to cut off the communications with the video conference apparatus 1000 on the other end.

The user then disconnects the cables from the image input terminal 90, the image output terminal 92, and the LAN terminal 94. Furthermore, the user rotates the camera housing 34 with respect to the arm 36 about the second axis and the third axis as appropriate to make the image input unit 31 into the reference state. The user then rotates the image input unit 31 in the reference state about the third axis, thereby housing the image input unit 31 in the stepped recess 12. Thus, the image input unit 31 is positioned at the covering position. When being housed in the stepped recess 12, the image input unit 31 is locked in the housing 10 by the action of the lock mechanism.

When the rotating member 33 is positioned at the covering position, the video conference apparatus 1000 has an A4-sized nearly plate shape in a planar view.

If the rotating member 33 is positioned at the covering position, the image capturing lens 32a, the projector lens 23a, the inlet port 16, the image input terminal 90, the image output terminal 92, and the LAN terminal 94 are covered from the outside.

As described above, the video conference apparatus 1000 according to the present embodiment includes the housing 10, the rotating member 33 (moving unit), the projector 20, and the electronic camera 32. The rotating member 33 (moving unit) is provided to be movable relatively with respect to the housing 10. The projector 20 is provided in the housing 10 and includes the projector lens 23a that projects light modulated based on image information. The electronic camera 32 is provided in the rotating member 33 and includes the image capturing lens 32a that inputs an image. The rotating member 33 can be rotated relatively with respect to the housing 10 about the first axis between the covering position at which the projector lens 23a and the image capturing lens 32a are covered and the exposing position at which the projector lens 23a and the image capturing lens 32a are exposed.

In this case, simply by rotating the rotating member 33 relatively with respect to the housing 10 about the first axis, the projector lens 23a and the image capturing lens 32a can be exposed or covered. In other words, the projector lens 23a and the image capturing lens 32a can be exposed or covered without difficulty.

No cap to protect each lens is required. Furthermore, if the rotating member 33 is positioned at the covering position, the rotating member 33 can protect each lens and prevent foreign materials from adhering to the lens. Adhesion of foreign materials to the projector lens 23a may possibly deteriorate the quality of an image to be projected. Adhesion of foreign materials to the image capturing lens 32a may possibly deteriorate the quality of an image to be transmitted to the video conference apparatus 1000 on the other end.

In other words, the video conference apparatus 1000 can be readily changed between the form when not in use in which each lens is covered and the form when in use in which each lens is exposed.

If the rotating member 33 is positioned at the exposing position, for example, the electronic camera 32 is separated from the projector 20. In this case, when the projector 20 is operating, that is, when light is being projected from the projector 20, it is possible to prevent heat generated in the projector 20 from being transferred to the electronic camera 32 as much as possible. As a result, the electronic camera 32 can be prevented from being damaged.

If the rotating member 33 is positioned at the covering position, the inlet port 16 is covered. By contrast, if the rotating member 33 is positioned at the exposing position, the inlet port 16 is exposed.

In this case, when the video conference apparatus 1000 is not in use, it is possible to prevent entrance of foreign materials, such as grit and dust, into the housing 10 through the inlet port 16. By contrast, when the video conference apparatus 1000 is in use, it is possible to cause the air to flow into the housing 10 efficiently through the inlet port 16. Entrance of foreign materials into the housing 10 may possibly cause trouble in the projector 20 and the control device 60, for example.

If the rotating member 33 is positioned at the covering position, the image input terminal 90, the image output terminal 92, and the LAN terminal 94 are covered. By contrast, if the rotating member 33 is positioned at the exposing position, the image input terminal 90, the image output terminal 92, and the LAN terminal 94 are exposed.

In this case, it is possible to prevent adhesion of foreign materials to each terminal when the video conference apparatus 1000 is not in use and to connect a corresponding cable to each terminal when the video conference apparatus 1000 is in use. Adhesion of foreign materials to each terminal may possibly interfere with input and output of information from and to the external devices and the network, for example.

By making the computer program for a conference apparatus used for the video conference apparatus 1000 according to the present embodiment equivalent to a software-based program using a PC, it is possible to establish a conference system without the relay apparatus 4 or the communication management apparatus 5 (it is also possible to establish a conference system using a LAN or a wide area network (WAN) alone). Thus, the video conference apparatus 1000 according to the present embodiment is not necessarily used for establishment of the conference system 2000.

Because the video conference apparatus 1000 is small, thin, and excellent in portability in the form when not in use, the user can carry the video conference apparatus 1000 in a manner directly holding the video conference apparatus 1000 under his/her arm or simply putting the video conference apparatus 1000 in a bag, for example. Therefore, the video conference apparatus 1000 is not necessarily used in a place such as a dedicated conference room and can be brought and used in various places.

Modifications of the present invention will be described below. In each modification, differences from the embodiment are mainly explained. Members with the same configurations as those in the embodiment are represented by similar reference numerals, and the explanations thereof are omitted.

First Modification

Figure 9:
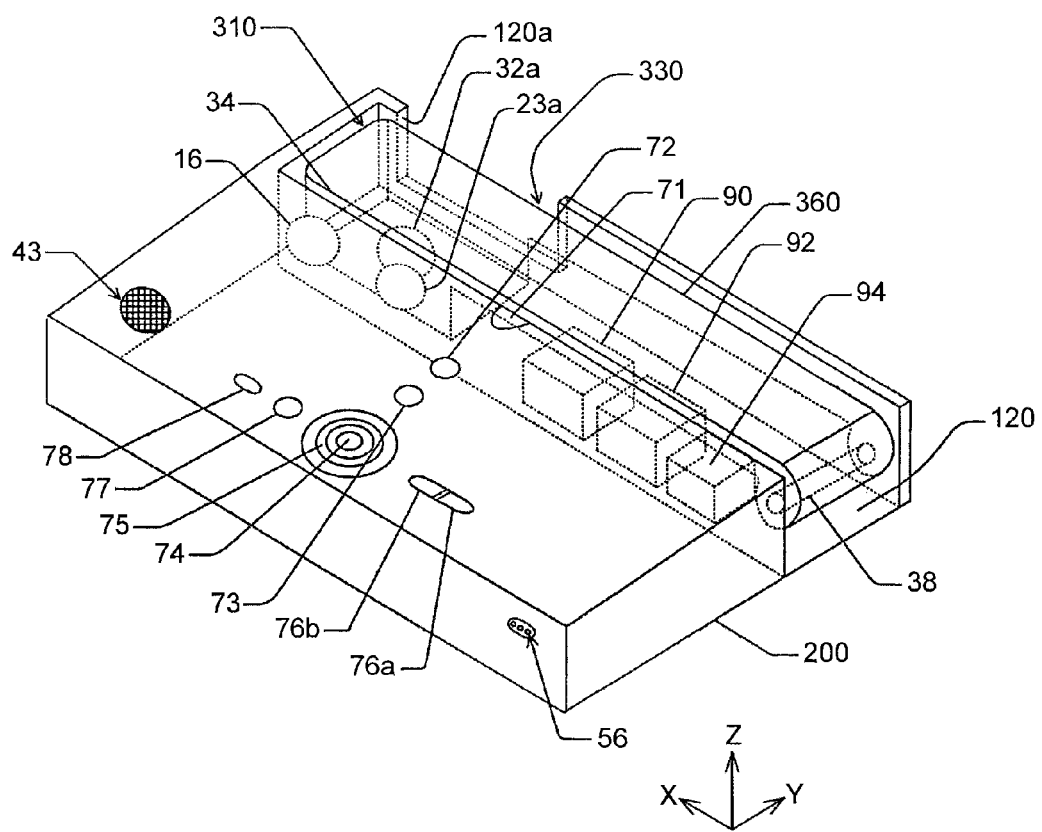
FIG. 9 is a perspective view of a video conference apparatus according to a first modification illustrating a state where a rotating member is positioned at the covering position.

As illustrated in FIG. 9, a first modification is different from the embodiment in the positions of an image input unit 310, a projector 20, an image input terminal 90, an image output terminal 92, and a LAN terminal 94.

As illustrated in FIG. 9, instead of the stepped recess 12, a recess 120 extending along nearly the whole area in the X-axis direction is formed at the end on the positive side in the Y-axis direction on the surface on the positive side in the Z-axis direction of a housing 200 in the first modification. The image input unit 310 is housed in the recess 120 in a manner nearly fit therein in a planar view. A cut-out 120a is formed at a portion on the negative side in the X-axis direction on the surface defining the recess 120 on the positive side in the Y-axis direction.

If the image input unit 310 is positioned at the housed position, an electronic camera 32 is housed in a portion on the positive side in the X-axis direction of the recess 120 such that an image capturing lens 32a faces the negative side in the Z-axis direction. The arm 360 is housed in a portion on the negative side in the X-axis direction of the recess 120.

The arm 360 is formed of a flat hollow member parallel to the XY plane. If the image input unit 310 is positioned at the housed position, the image input terminal 90, the image output terminal 92, and the LAN terminal 94 mounted on a main board 62 are positioned on the negative side in the Z-axis direction with respect to the arm 360 in a manner aligned along the X-axis direction.

The projector 20 is housed on the positive side in the X-axis direction in the housing 200. A projector lens 23a is fit into an opening formed at a portion on the positive side in the X-axis direction on the surface defining the recess 120 on the negative side in the Y-axis direction. An inlet port 16 is formed at a portion on the positive side in the X-axis direction with respect to the opening into which the projector lens 23a is fit on the surface defining the recess 120 on the negative side in the Y-axis direction.

Thus, if the image input unit 310 is positioned at the housed position, the image capturing lens 32a faces the bottom surface (surface on the negative side in the Z-axis direction) defining the recess 120 in the housing 200 in proximity thereto. The projector lens 23a and the inlet port 16 face the surface defining the recess 120 on the negative side in the Y-axis direction in the housing 200 in proximity thereto. The image input terminal 90, the image output terminal 92, and the LAN terminal 94 face the surface on the negative side in the Z-axis direction of the arm 360 in the recess 120.

In other words, if the image input unit 310 is positioned at the housed position, the projector lens 23a, the inlet port 16, the image input terminal 90, the image output terminal 92, and the LAN terminal 94 are covered.

Figure 10:
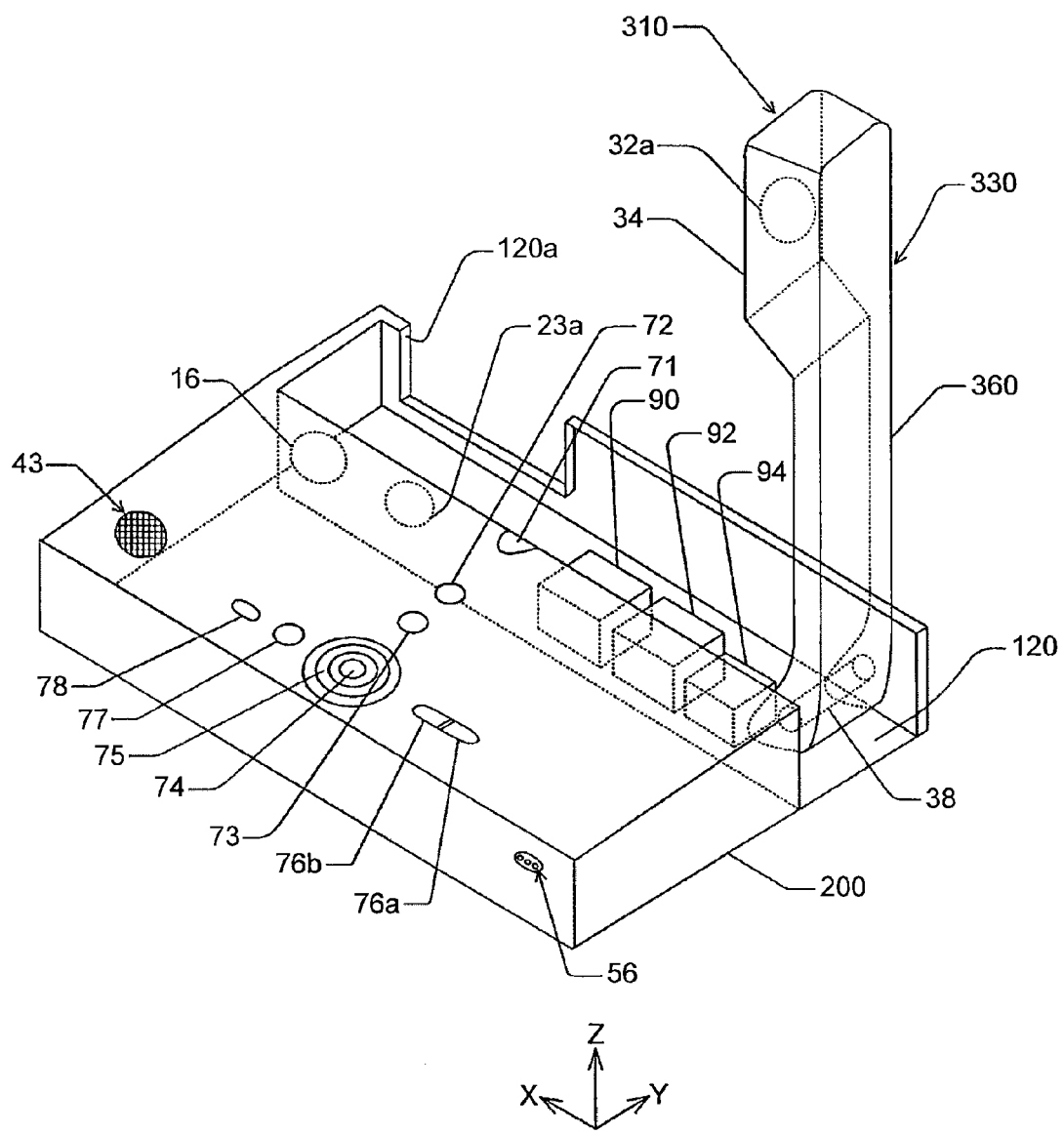
FIG. 10 is a perspective view of the video conference apparatus according to the first modification illustrating a state where the rotating member is positioned at the exposing position.

If the image input unit 310 is rotated by a certain angle (e.g., 90 degrees) from the housed position, the projector lens 23a, the inlet port 16, the image input terminal 90, the image output terminal 92, and the LAN terminal 94 are exposed (refer to FIG. 10).

In this case, because the projector lens 23a is opposite to (faces) the cut-out 120a, the projector lens 23a can project light to the outside of the housing 200 through the cut-out 120a. Because the inlet port 16 also faces the cut-out 120a, it is possible to cause the air to flow into the housing 200 efficiently through the inlet port 16.

As a result, a rotating member 330, which is a part of the image input unit 310 other than the electronic camera 32, can be rotated between the covering position and the exposing position. The covering position is a position where the projector lens 23a, the inlet port 16, the image input terminal 90, the image output terminal 92, and the LAN terminal 94 are covered. The exposing position is a position where the projector lens 23a, the inlet port 16, the image input terminal 90, the image output terminal 92, and the LAN terminal 94 are exposed.

The first modification can provide the same advantageous effects as those in the embodiment.

In the first modification, the projector 20 may be arranged on the negative side in the X-axis direction in the housing 200, for example. In this case, if the rotating member 330 is positioned at the covering position, the electronic camera 32 and the projector 20 are not adjacent to each other. As a result, it is possible to prevent heat generated in the projector 20 from being transferred to the electronic camera 32, thereby preventing the electronic camera 32 from being damaged.

Second Modification

Figure 11A:
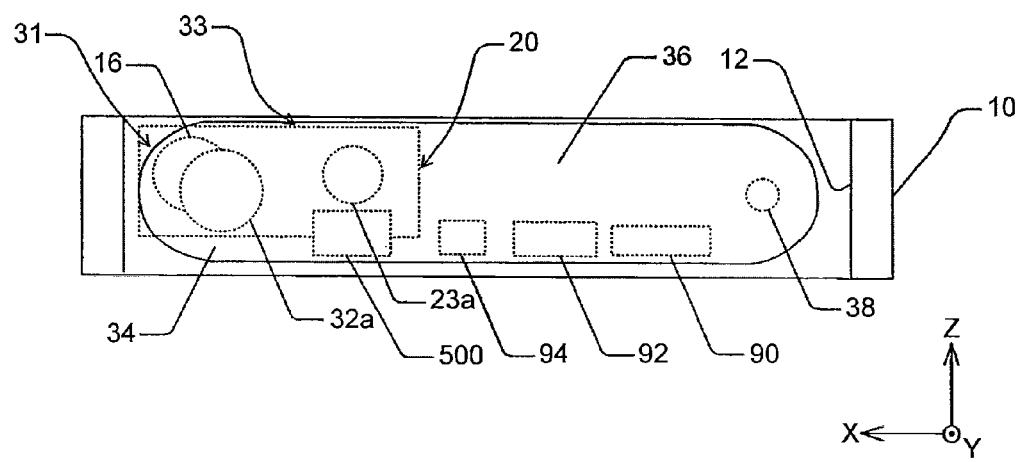
FIG. 11A is a back view of a video conference apparatus according to a second modification illustrating a state where a rotating member is positioned at the covering position.
Figure 11B:
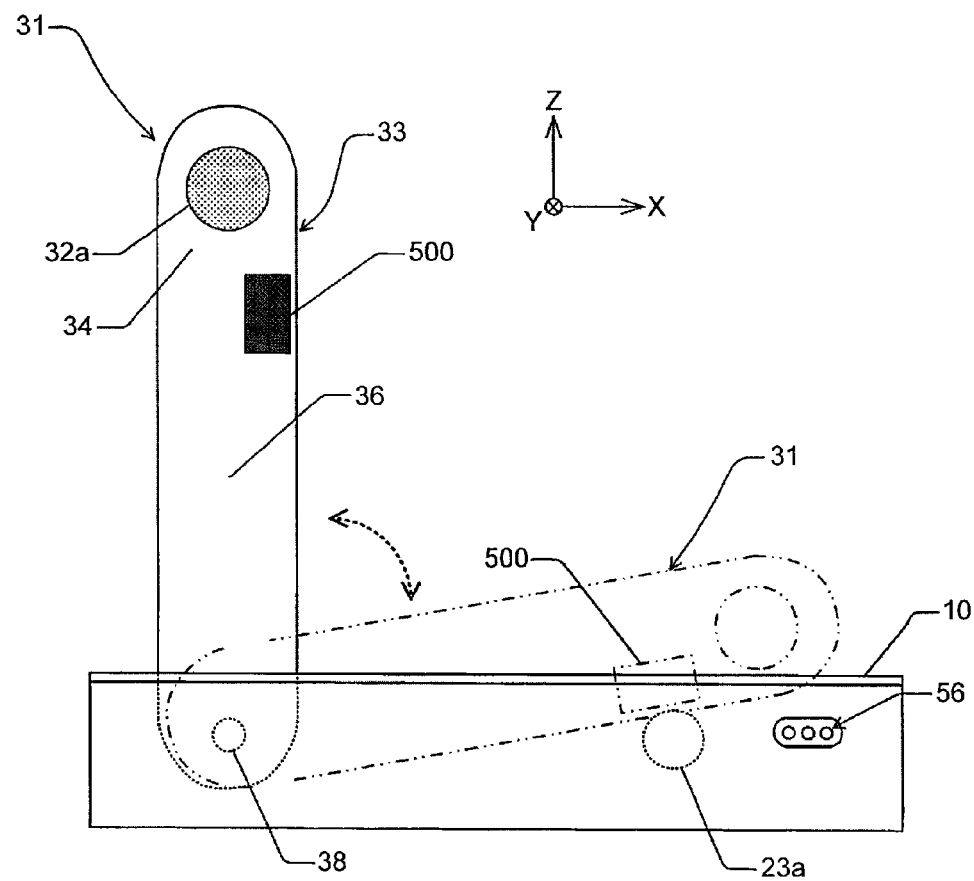
FIG. 11B is a front view of the video conference apparatus according to the second modification illustrating a state where the rotating member is positioned at the exposing position.

As illustrated in FIG. 11A and FIG. 11B, a second modification is different from the embodiment in that a cleaning member 500 that cleans a projector lens 23a is attached to a rotating member 33.

A brush obtained by attaching a number of bristle materials to a plate member, which is not illustrated, is used as the cleaning member 500. In consideration of heat generated from a projector 20, a bristle material with high heat resistance (whose upper temperature limit is at least 80 degrees C. to 200 degrees C.) is preferably used. Instead of the brush, a cloth, such as a nonwoven fabric, may be used as the cleaning member. In this case as well, a cloth with high heat resistance is preferably used.

As illustrated in FIG. 11A, for example, the cleaning member 500 is attached to a portion on the negative side in the Z-axis direction and the positive side in the Y-axis direction with respect to the projector lens 23a on the surface of the rotating member 33 positioned at the covering position on the negative side in the Y-axis direction. In other words, the projector lens 23a is positioned in a rotation trajectory (a rotation area) of the bristle materials of the cleaning member 500 drawn in association with rotation of the rotating member 33 (refer to FIG. 11B). The bristle materials simply need to be arranged at least over an area facing the whole surface of the projector lens 23a.

Figure 12A:
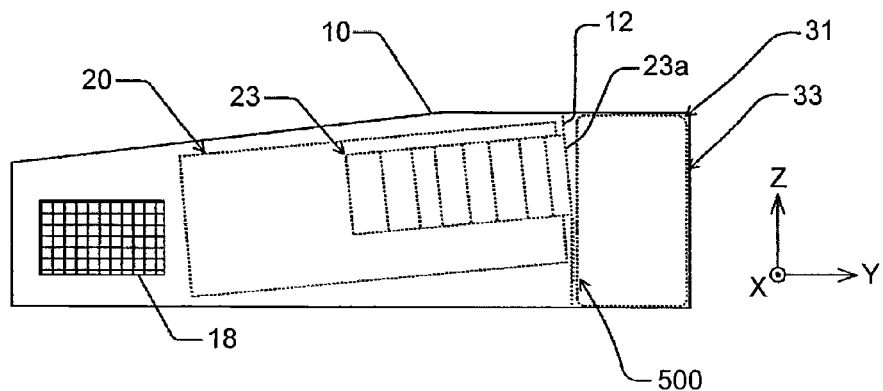
FIGS. 12A to 12C are a first view to a third view, respectively, for explaining a cleaning operation for a projector lens in association with rotation of the rotating member in the video conference apparatus according to the second modification.
Figure 12B:
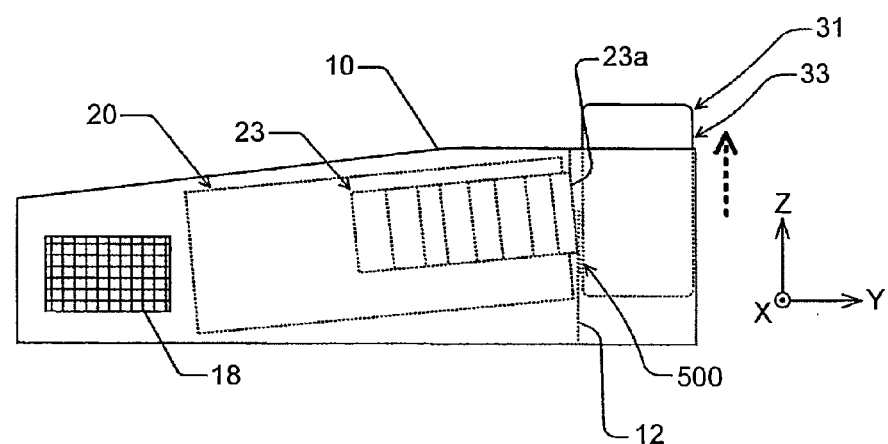
Figure 12C:
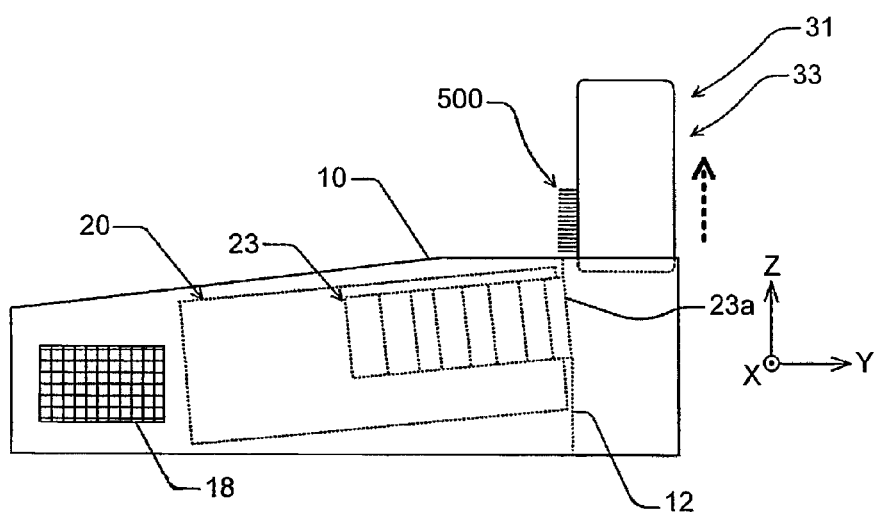

If the rotating member 33 is positioned at the covering position, the cleaning member 500 is in contact with the surface defining a stepped recess 12 on the negative side in the Y-axis direction in a bent manner (refer to FIG. 12A). If the rotating member 33 is rotated from the covering position to the exposing position, the bristle materials of the cleaning member 500 come into contact with the projector lens 23a when reaching a position facing the projector lens 23a, and cleaning of the projector lens 23a is started. In other words, the bristle materials of the cleaning member 500 swing on the projector lens 23a in association with rotation of the rotating member 33 toward the exposing position, whereby the projector lens 23a is cleaned (refer to FIG. 12B). When the cleaning member 500 leaves the position facing the projector lens 23a, cleaning of the projector lens 23a is finished (refer to FIG. 12C).

Figure 13A:
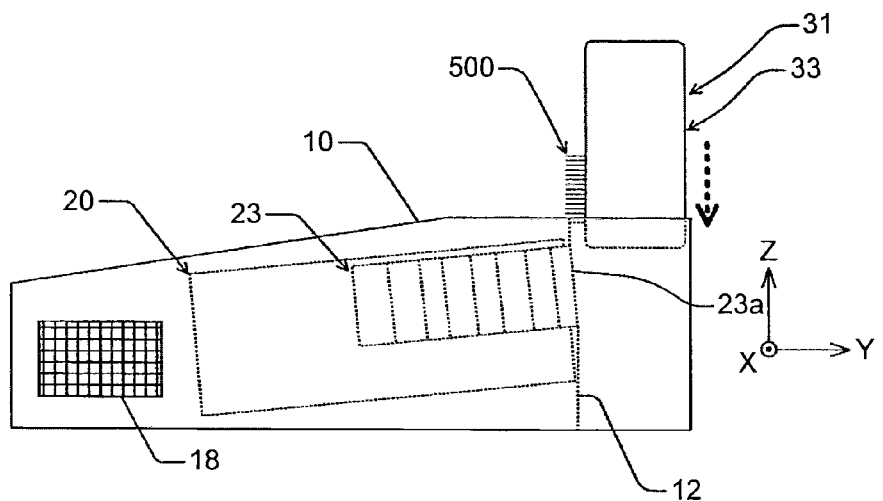
FIGS. 13A to 13C are a fourth view to a sixth view, respectively, for explaining the cleaning operation for the projector lens in association with rotation of the rotating member in the video conference apparatus according to the second modification.
Figure 13B:
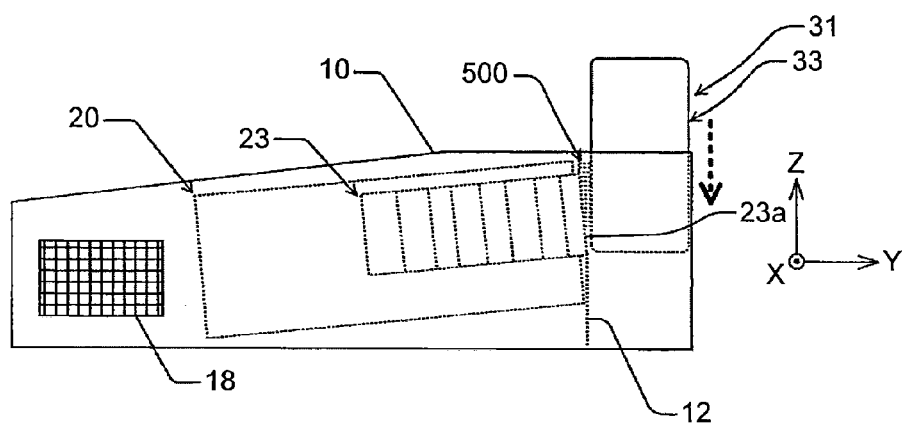
Figure 13C:
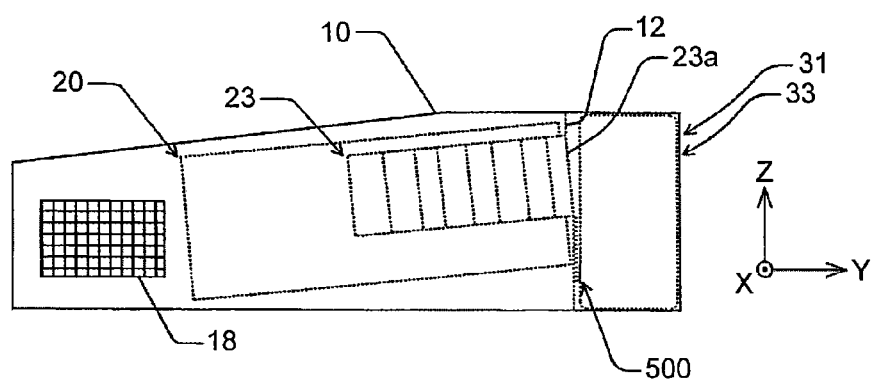

By contrast, if the rotating member 33 is rotated from the exposing position to the covering position, the bristle materials of the cleaning member 500 come into contact with the projector lens 23a when reaching the position facing the projector lens 23a, and cleaning of the projector lens 23a is started (refer to FIG. 13A). In other words, the bristle materials of the cleaning member 500 swing on the projector lens 23a in association with rotation of the rotating member 33 toward the covering position, whereby the projector lens 23a is cleaned (refer to FIG. 13B). When the cleaning member 500 leaves the position facing the opening, cleaning of the projector lens 23a is finished (refer to FIG. 13C).

The second modification can clean the projector lens 23a when the rotating member 33 is rotated between the covering position and the exposing position. In other words, it is possible to clean the projector lens 23a in association with transformation of the video conference apparatus between the form when not in use and the form when in use. In this case, it is not necessary to clean (e.g., wipe) the projector lens 23a.

Third Modification

Figure 14A:
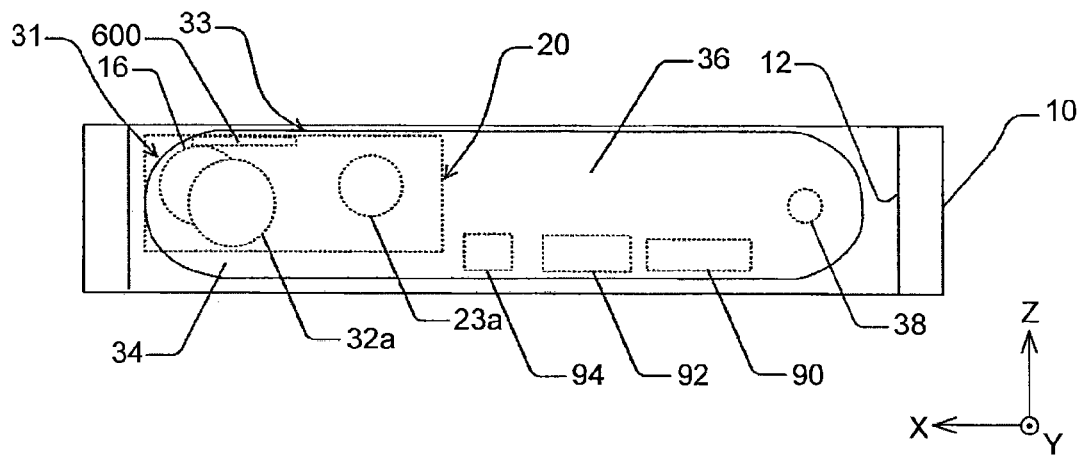
FIG. 14A is a back view of a video conference apparatus according to a third modification illustrating a state where a rotating member is positioned at the covering position.
Figure 14B:
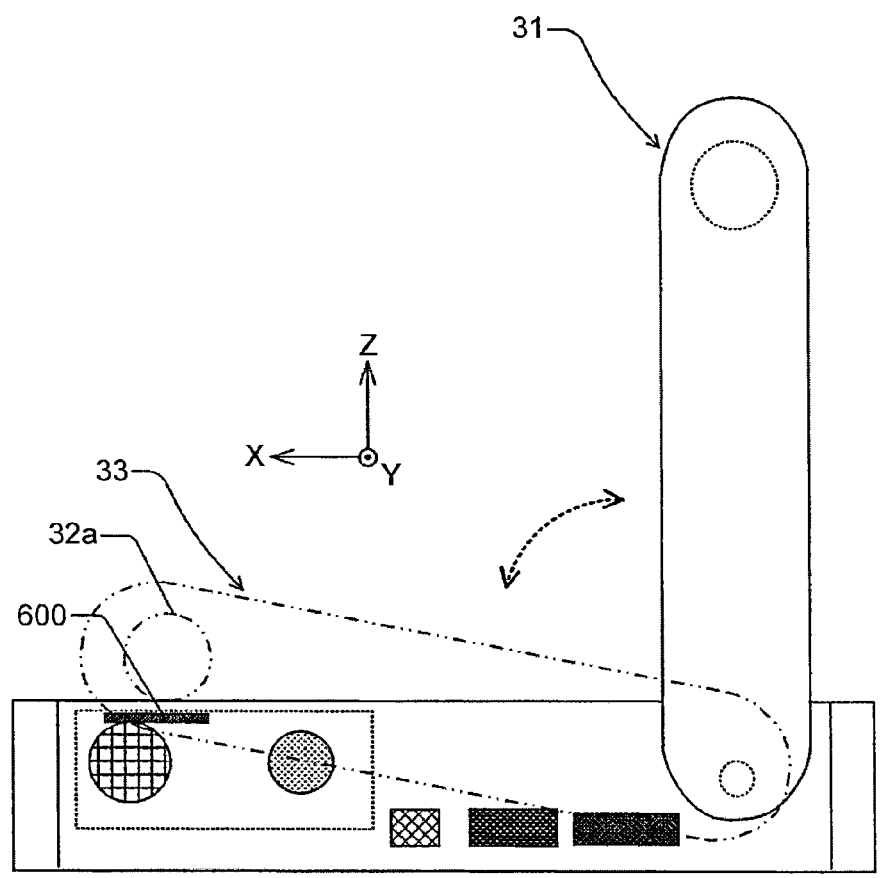
FIG. 14B is a back view of the video conference apparatus according to the third modification illustrating a state where the rotating member is positioned at the exposing position.

As illustrated in FIG. 14A and FIG. 14B, a third modification is different from the embodiment in that a cleaning member 600 that cleans an image capturing lens 32a is attached to a housing 10.

A brush obtained by attaching a number of bristle materials to a plate member, which is not illustrated, is used as the cleaning member 600. In consideration of heat generated from a projector 20, a bristle material with high heat resistance (whose upper temperature limit is at least 80 degrees C. to 200 degrees C.) is preferably used. Instead of the brush, a cloth, such as a nonwoven fabric, may be used as the cleaning member. In this case as well, a cloth with high heat resistance is preferably used.

As illustrated in FIG. 14A, for example, the cleaning member 600 is attached to a portion on the positive side in the Z-axis direction and the negative side in the Y-axis direction with respect to the image capturing lens 32a on the surface defining a large-depth recess 12a on the negative side in the Y-axis direction in the housing 10 when a rotating member 33 is positioned at the covering position. In other words, the bristle materials of the cleaning member 600 is positioned in a rotation trajectory (a rotation area) of the image capturing lens 32a drawn in association with rotation of the rotating member 33 (refer to FIG. 14B). The bristle materials simply need to be arranged at least over an area facing the whole surface of the image capturing lens 32a.

Figure 15A:
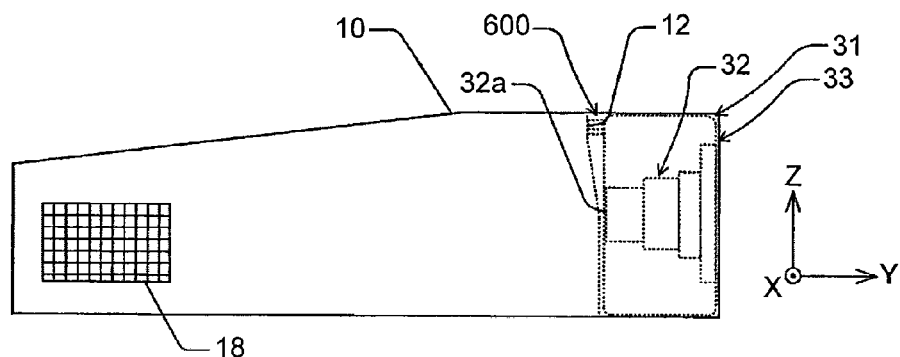
FIGS. 15A to 15C are a first view to a third view, respectively, for explaining a cleaning operation for an image capturing lens in association with rotation of the rotating member in the video conference apparatus according to the third modification.
Figure 15B:
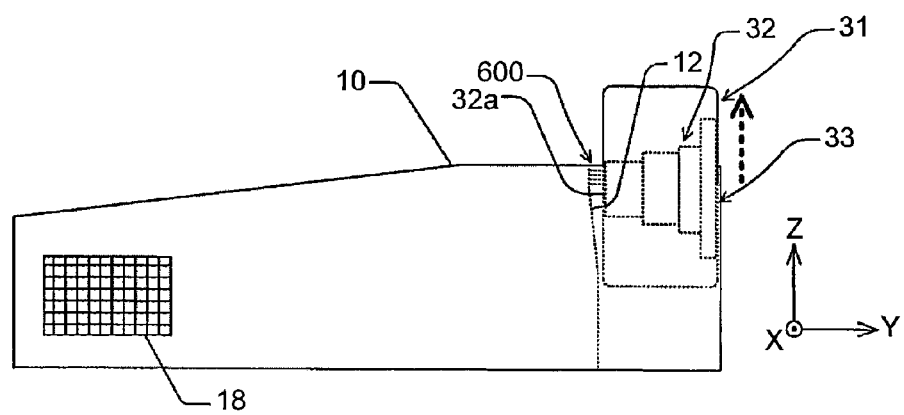
Figure 15C:
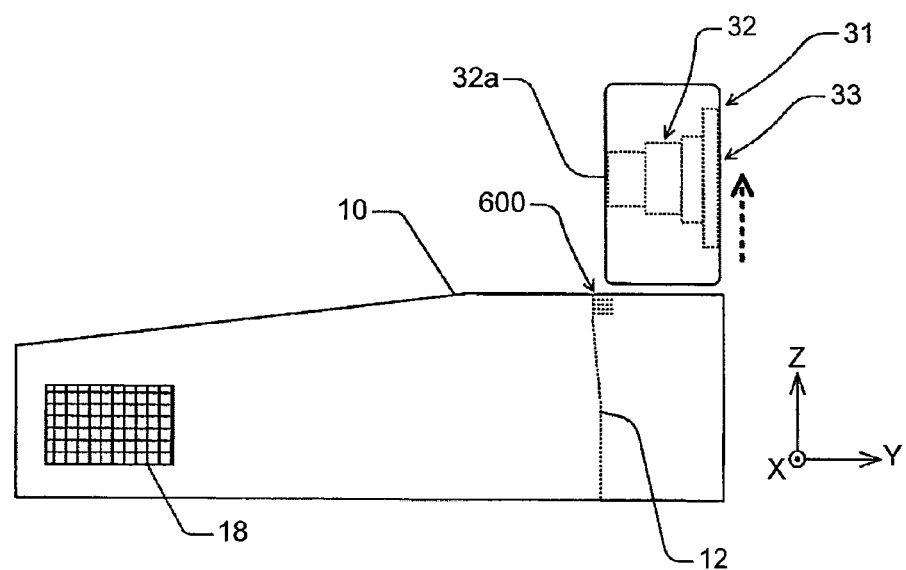

If the rotating member 33 is positioned at the covering position, the cleaning member 600 is in contact with the surface on the negative side in the Y-axis direction of the rotating member 33 (a camera housing 34) in a bent manner (refer to FIG. 15A). If the rotating member 33 is rotated from the covering position to the exposing position, the image capturing lens 32a comes into contact with the bristle materials of the cleaning member 600 when reaching a position facing the cleaning member 600, and cleaning of the image capturing lens 32a is started. In other words, the image capturing lens 32a swings on the bristle materials of the cleaning member 600 in association with rotation of the rotating member 33 toward the exposing position, whereby the image capturing lens 32a is cleaned (refer to FIG. 15B). When the image capturing lens 32a leaves the position facing the cleaning member 600, cleaning of the image capturing lens 32a is finished (refer to FIG. 15C).

Figure 16A:
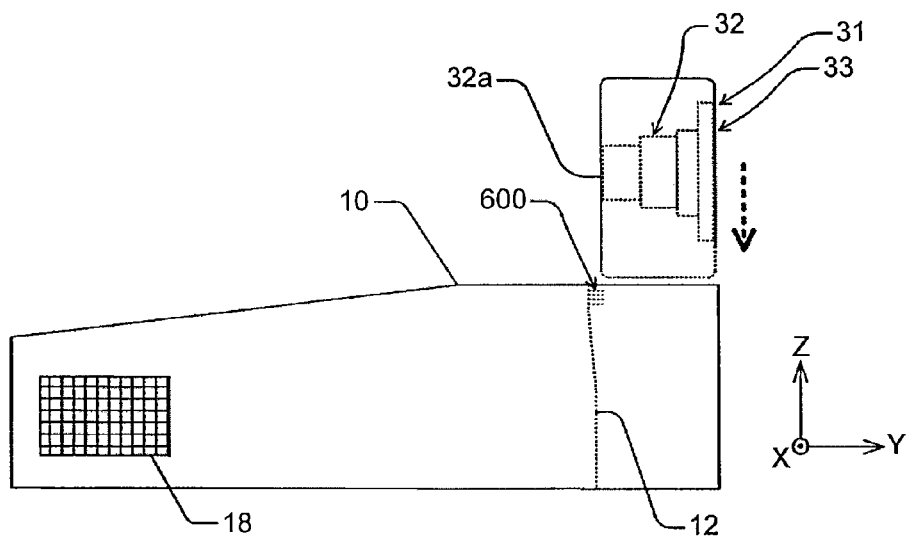
FIGS. 16A to 16C are a fourth view to a sixth view, respectively, for explaining the cleaning operation for the image capturing lens in association with rotation of the rotating member in the video conference apparatus according to the third modification.
Figure 16B:
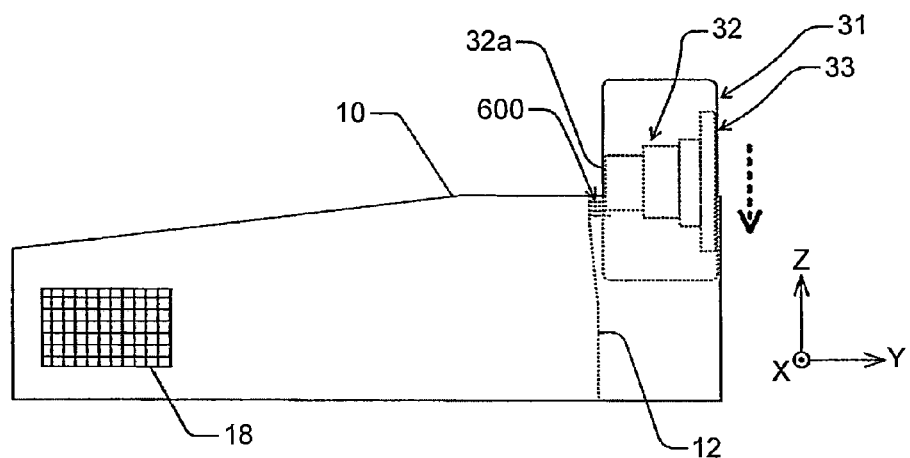
Figure 16C:
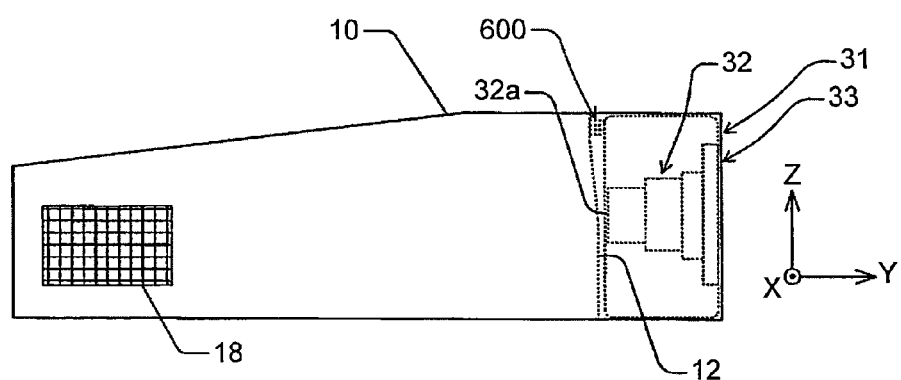

By contrast, if the rotating member 33 is rotated from the exposing position to the covering position, the image capturing lens 32a comes into contact with the bristle materials of the cleaning member 600 when reaching the position facing the cleaning member 600, and cleaning of the image capturing lens 32a is started (refer to FIG. 16A). In other words, the image capturing lens 32a swings on the bristle materials of the cleaning member 600 in association with rotation of the rotating member 33 toward the covering position, whereby the image capturing lens 32a is cleaned (refer to FIG. 16B). When the image capturing lens 32a leaves the position facing the cleaning member 600, cleaning of the image capturing lens 32a is finished (refer to FIG. 16C).

The third modification can clean the image capturing lens 32a when the rotating member 33 is rotated between the covering position and the exposing position. In other words, it is possible to clean the image capturing lens 32a in association with transformation of the video conference apparatus between the form when not in use and the form when in use. In this case, it is not necessary to clean (e.g., wipe) the image capturing lens 32a.

Fourth Modification

Figure 17A:
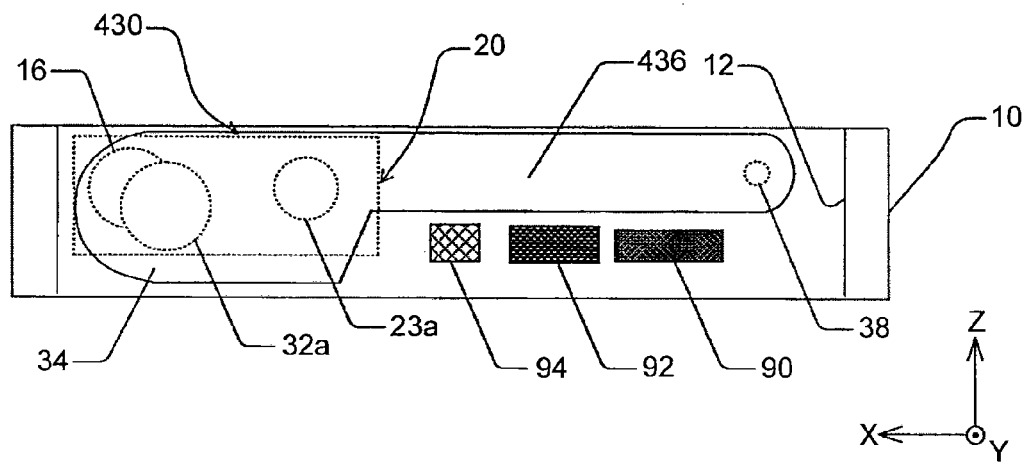
FIG. 17A is a back view of a video conference apparatus according to a fourth modification illustrating a state where a rotating member is positioned at the covering position.
Figure 17B:
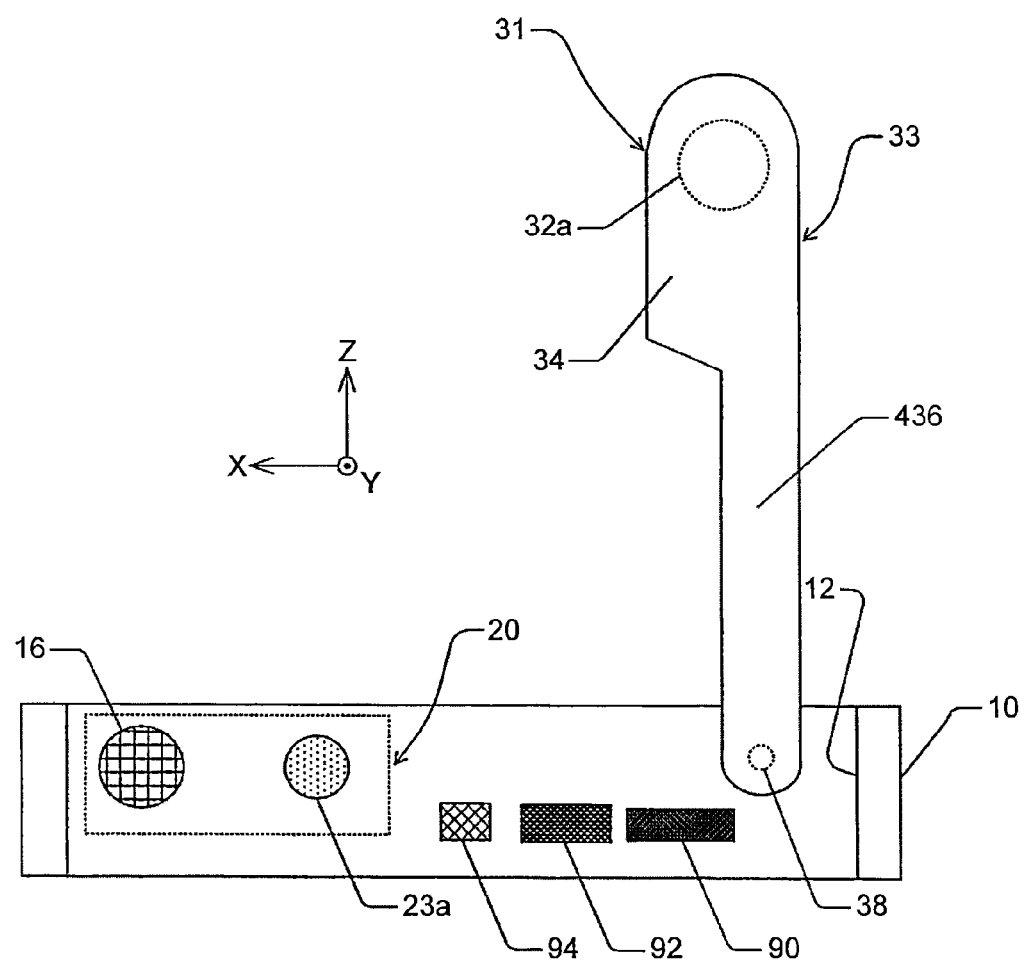
FIG. 17B is a back view of the video conference apparatus according to the fourth modification illustrating a state where the rotating member is positioned at the exposing position.

As illustrated in FIG. 17A and FIG. 17B, a fourth modification is different from the embodiment in the shape and the attachment position of a rotating member.

As illustrated in FIG. 17A, in the fourth modification, the shape and the attachment position of a rotating member 430 are determined such that, when the rotating member 430 is positioned at the covering position, an image input terminal 90, an image output terminal 92, and a LAN terminal 94 are exposed.

Specifically, in the rotating member 430, the length of an arm 436 in a direction (the lateral direction) orthogonal to the longitudinal direction is shortened (e.g., to nearly half the length), and the position of a one-axis hinge 38, that is, the position of a rotation fulcrum of the rotating member 430 is shifted to the positive side in the Z-axis direction compared with the rotating member 33 in the embodiment. In other words, the rotating member 430 has a shape obtained by removing a portion facing the image input terminal 90, the image output terminal 92, and the LAN terminal 94 from the rotating member 33.

As illustrated in FIG. 17B, if the rotating member 430 is positioned at the exposing position, the image input terminal 90, the image output terminal 92, and the LAN terminal 94 are exposed.

In other words, the image input terminal 90, the image output terminal 92, and the LAN terminal 94 are always exposed regardless of the position of the rotating member 430.

In the fourth modification, a cable corresponding to each of the image input terminal 90, the image output terminal 92, and the LAN terminal 94 can be attached thereto and detached therefrom regardless of the position of the rotating member 430.

Fifth Modification

Figure 18:
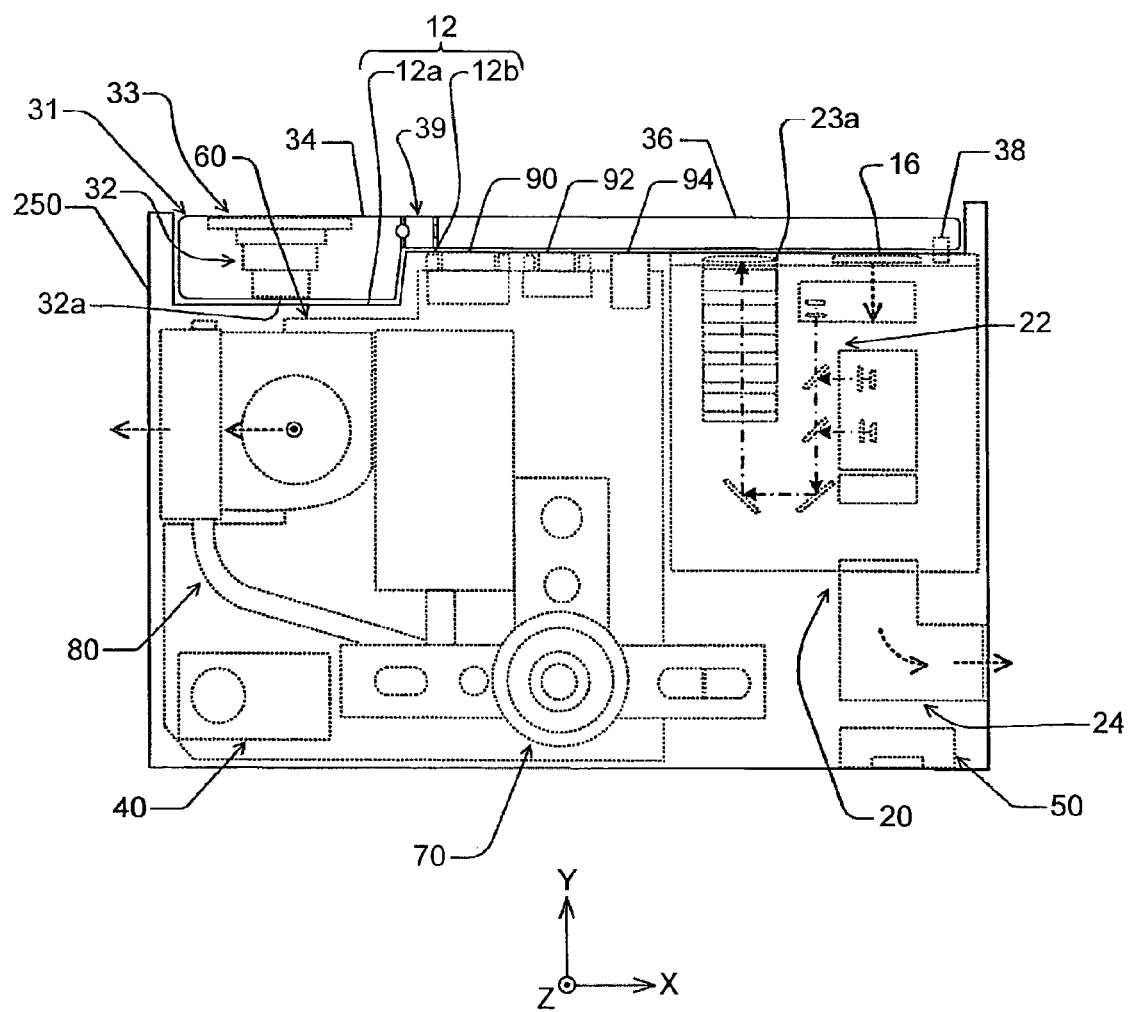
FIG. 18 is a view for explaining a configuration of a video conference apparatus according to a fifth modification.

As illustrated in FIG. 18, a fifth modification is different from the embodiment in the positions of an electronic camera 32 and a projector 20.

In the fifth modification, an image input unit 31 is attached to a housing in a direction opposite to that in the embodiment.

In a stepped recess 12 formed in a housing 250, a large-depth recess 12a is positioned on the negative side in the X-axis direction, and a small-depth recess 12b is positioned on the positive side in the X-axis direction.

If the image input unit 31 is housed in the stepped recess 12, a camera housing 34 housing the electronic camera 32 is positioned in the large-depth recess 12a, and an arm 36 is positioned in the small-depth recess 12b.

In this case, an image capturing lens 32a faces the surface defining the large-depth recess 12a on the negative side in the Y-axis direction in proximity thereto, and a projector lens 23a, an inlet port 16, an image input terminal 90, an image output terminal 92, and a LAN terminal 94 face the arm 36 in proximity thereto.

A material with an excellent heat-radiation property, such as aluminum (whose thermal conductivity is 237 W/m·K), is used as the material of the arm 36. Therefore, heat generated in the projector 20 can be released to the outside efficiently, and transfer of the heat to the electronic camera 32 can be prevented. As a result, it is possible to prevent the electronic camera 32 from being damaged.

The "material with an excellent heat-radiation property" means a material having higher thermal conductivity than the thermal conductivity of a plastic such as acrylonitrile-butadiene-styrene (ABS) resin (e.g., 0.1 to 0.4 W/m·K).

Instead of using a material with an excellent heat-radiation property as the material of the arm 36, a heat-radiation sheet or a cooling pad (whose thermal conductivity is approximately 1 to 20 W/m·K, such as a heat-radiation silicon material) may be attached to the arm.

Instead of or in addition to enhancing the heat-radiation property of the arm 36 or the member attached to the arm 36 as described above, a material with a low heat-radiation property (a material with a heat-insulating property), such as a plastic of ABS resin (whose thermal conductivity is 0.1 to 0.4 W/m·K, for example), may be used as the material of the camera housing 34. Alternatively, a heat-insulating material may be provided at a portion between the camera housing 34 and the arm 36 (e.g., a two-axis hinge). Still alternatively, the gap between the camera housing 34 and the arm 36 may be increased.

In this case, it is possible to prevent heat generated in the projector 20 and transferred to the arm 36 from being transferred to the electronic camera 32. As a result, the electronic camera 32 can be prevented from being damaged.

In the fifth modification, when the rotating member 33 is positioned at the covering position, the electronic camera 32 and the projector 20 are positioned away from each other. As a result, it is possible to prevent heat generated in the projector 20 from being transferred to the electronic camera 32. As a result, damage to the electronic camera 32 can be prevented.

Sixth Modification

Figure 19:
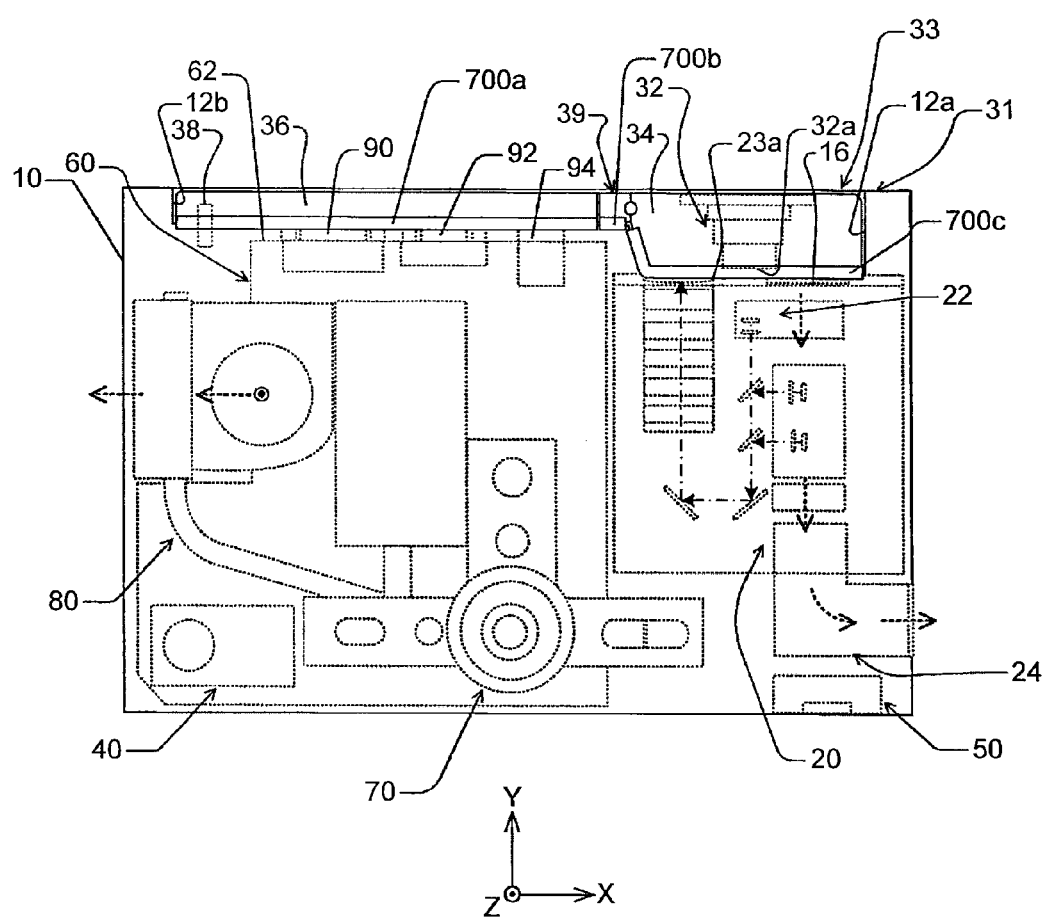
FIG. 19 is a view for explaining a covering member provided in a rotating member of a video conference apparatus according to a sixth modification.

As illustrated in FIG. 19, a sixth modification is different from the embodiment in that a plurality of (e.g., three) covering members 700a, 700b, and 700c are attached to a rotating member 33. The covering members 700a, 700b, and 700c cover, from the positive side in the Z-axis direction, the gap between an image input unit 31 positioned at the housed position and the surface defining a stepped recess 12 on the negative side in the Y-axis direction.

A thin plate member is used as each of the covering members, for example.

The covering member 700a is attached to the surface on the positive side in the Z-axis direction of an arm 36 so as to protrude toward the negative side in the Y-axis direction when the rotating member 33 is positioned at the covering position. The covering member 700b is attached to the surface on the positive side in the Z-axis direction of a two-axis hinge so as to protrude toward the negative side in the Y-axis direction when the rotating member 33 is positioned at the covering position. The covering member 700c is attached to the surface on the positive side in the Z-axis direction of a camera housing 34 so as to protrude toward the negative side in the Y-axis direction when the rotating member 33 is positioned at the covering position. In consideration of heat generated from a projector 20, a material with high heat resistance is preferably used as the material of the covering members 700b and 700c in particular.

In this case, if the image input unit 31 is positioned at the housed position, the gap between the image input unit 31 and the surface defining the stepped recess 12 on the negative side in the Y-axis direction can be covered from the positive side in the Z-axis direction.

In the sixth modification, the gap formed by the image input unit 31 provided to be rotatable to a housing 10 is covered from the positive side in the Z-axis direction with the covering members. Therefore, it is possible to prevent adhesion or entrance of foreign materials to an image capturing lens 32a, a projector lens 23a, an inlet port 16, an image input terminal 90, an image output terminal 92, and a LAN terminal 94 through the gap.

The three covering members are attached so as to cover nearly the whole area of the gap in the sixth modification. Alternatively, the covering member may cover only the gap between at least one of the projector lens 23a, the image capturing lens 32a, the inlet port 16, the image input terminal 90, the image output terminal 92, and the LAN terminal 94, for example, and the rotating member 33 positioned at the covering position. In this case, the number of the covering members can be changed as appropriate.

Seventh Modification

As illustrated in FIG. 20A to FIG. 20D, a seventh modification is different from the embodiment in that a guiding mechanism 850 for a rotating member 33 is provided in a housing 10. FIG. 20A to FIG. 20D are sectional views along the YZ plane (a first sectional view to a fourth sectional view) of an arm 36 and the housing 10.

When the rotating member 33 is positioned at the covering position, the surface of the arm 36 placed on the surface defining a stepped recess 12 on the negative side in the Z-axis direction is referred to as a placed surface, and the surface of the arm 36 facing the surface defining the stepped recess 12 on the negative side in the Y-axis direction is referred to as a facing surface. The surface defining the stepped recess 12 on the negative side in the Y-axis direction is referred to as a faced surface.

As illustrated in FIG. 20A, a first hole 36a is formed at the end on the negative side in the Y-axis direction of the placed surface, and a second hole 36b is formed at the end on the negative side in the Z-axis direction of the facing surface.

The guiding mechanism 830 includes a pair of moving members 850 and a guiding surface 852 that guides the movement of the pair of moving members 850.

The pair of moving members 850 is arranged in a manner separated from each other in the Z-axis direction and is connected to each other with a member having flexibility to some extent and being hard to extend, for example.

Hereinafter, the moving member 850 on the positive side in the Z-axis direction is also referred to as an upper moving member 850a, and the moving member 850 on the negative side in the Z-axis direction is also referred to as a lower moving member 850b. The pair of moving members 850 can move (swing) along the guiding surface 852. If external force in the negative Z-axis direction acts on the lower moving member 850b, the pair of moving members 850 moves in the negative Z-axis direction. By contrast, if external force in the positive Z-axis direction acts on the upper moving member 850a, the pair of moving members 850 moves in the positive Z-axis direction.

The guiding surface 852 is formed on the back surface of the faced surface in the housing 10. The guiding surface 852 includes a first guiding surface, a second guiding surface, and a third guiding surface. The first guising surface is positioned on the most positive side in the Z-axis direction and parallel to the XZ plane. The second guiding surface extends obliquely downward to the negative side in the Z-axis direction and the negative side in the Y-axis direction from the end on the negative side in the Z-axis direction of the first guiding surface. The third guiding surface extends in the negative Z-axis direction from the end on the negative side in the Z-axis direction of the second guiding surface and is parallel to the XZ plane.

If the rotating member 33 is positioned at the exposing position, a part of the upper moving member 850a protrudes toward the positive side in the Y-axis direction from the housing 10, and the rest thereof is in contact with the first guiding surface in the housing 10. A part of the lower moving member 850b protrudes toward the positive side in the Y-axis direction from the housing 10, and the rest thereof is in contact with the end on the negative side in the Z-axis direction of the first guiding surface in the housing 10. The position of the pair of moving members 850 at this time is referred to as an initial position. Hereinafter, the portion of the lower moving member 850b protruding toward the positive side in the Y-axis direction from the housing 10 is referred to as a first protruding portion, and the portion of the upper moving member 850a protruding toward the positive side in the Y-axis direction from the housing 10 is referred to as a second protruding portion.

The first protruding portion has an L shape in the YZ section, for example. If the rotating member 33 is positioned at the exposing position, the end on the positive side in the Y-axis direction of the first protruding portion (one side of the L) is aligned with the first hole 36a in the Y-axis direction. The upper end of the end on the negative side in the Y-axis direction of the first protruding portion is hereinafter referred to as a tip of the first protruding portion. The tip of the first protruding portion is formed in a size to fit into the first hole 36a.

The second protruding portion is composed of a portion extending in the Y-axis direction, for example. The second protruding portion is formed in a size to fit into the second hole 36b.

If the rotating member 33 is rotated toward the covering position, the tip of the first protruding portion is inserted into the first hole 36a, and external force in the negative Z-axis direction acts on the lower moving member 850b (refer to FIG. 20B). As a result, the lower moving member 850b comes into contact with the second guiding surface and moves obliquely downward to the negative side in the Z-axis direction and the negative side in the Y-axis direction along the second guiding surface. Furthermore, the upper moving member 850a moves in the negative Z-axis direction along the first guiding surface. At this time, because the second guiding surface applies external force in the negative Y-direction to the rotating member 33 via the lower moving member 850b, the rotating member 33 moves toward the negative side in the Y-axis direction as the rotating member 33 comes closer to the covering position. Therefore, the second protruding portion of the upper moving member 850a that moves in the negative Z-axis direction along the first guiding surface is inserted into the second hole 36b (refer to FIG. 20C).

If the rotating member 33 is positioned at the covering position, the lower moving member 850b comes into contact with the third guiding surface, and the rotating member 33 comes into contact with the faced surface (refer to FIG. 20D).

As a result, the gap between the rotating member 33 positioned at the covering position and the faced surface is eliminated.

By contrast, if the rotating member 33 illustrated in FIG. 20D is rotated from the covering position to the exposing position, external force in the positive Z-axis direction acts on the upper moving member 850a. As a result, the upper moving member 850a moves in the positive Z-axis direction along the first guiding surface, and the lower moving member 850b moves obliquely upward to the positive side in the Z-axis direction and the positive side in the Y-axis direction along the second guiding surface (refer to FIG. 20C). At this time, the rotating member 33 moves toward the positive side in the Y-axis direction. If the lower moving member 850b comes into contact with the first guiding surface, the second protruding portion is extracted from the second hole 36b (refer to FIG. 20B). Subsequently, the first protruding portion is extracted from the first hole 36a (refer to FIG. 20A).

As a result, the pair of moving members 850 is returned to the initial position.

In the seventh modification, when the rotating member 33 is rotated from the exposing position to the covering position, the rotating member 33 is guided to move closer to the faced surface by the action of the guiding mechanism 830. When the rotating member 33 is positioned at the covering position, the rotating member 33 comes into contact with the faced surface. As a result, foreign materials are prevented from entering through the gap between the rotating member 33 positioned at the covering position and the faced surface. Therefore, it is possible to prevent adhesion or entrance of foreign materials to an image capturing lens 32a, a projector lens 23a, an inlet port 16, an image input terminal 90, an image output terminal 92, and a LAN terminal 94.

Furthermore, because the pair of moving members 850 is returned to the initial position when the rotating member 33 is rotated from the covering position to the exposing position, the rotating member 33 can be guided repeatedly.

The guiding mechanism 830 is given just as an example, and the guiding mechanism is not limited thereto. In other words, the guiding mechanism simply needs to have a configuration to guide the rotating member 33 to move closer to the facing surface in association with rotation of the rotating member 33 from the exposing position to the covering position.

While the guiding mechanism 830 has the pair of moving members, the number of moving members is not limited thereto, and one or three or more moving members may be used. If a moving member alone is used, for example, a biasing member that biases the moving member (e.g., a moving member similar to the lower moving member 850b) toward the positive side in the Z-axis direction may be provided in the housing 10. In this case, the moving member can be returned to the initial position when the rotating member 33 is rotated from the covering position to the exposing position.

Furthermore, the guiding mechanism may have no moving member. In this case, by forming a tapered portion at the placed surface of the rotating member and by forming the stepped recess in a shape into which the tapered portion is fit, for example, the rotating member can come closer to the negative side in the Y-axis direction when the rotating member is rotated from the exposing position to the covering position.

Eighth Modification

If a cable is connected to at least one of three connectors (an image input terminal 90, an image output terminal 92, and a LAN terminal 94) and a rotating member is rotated from the exposing position to the covering position carelessly, an arm of the rotating member may possibly bend the cable, thereby damaging the cable.

More specifically, a cable connected to a connector usually has an allowable bending radius. If the cable is bent at a radius smaller than the allowable bending radius, stress concentration may possibly occur, resulting in electrical property degradation.

Figure 21A:
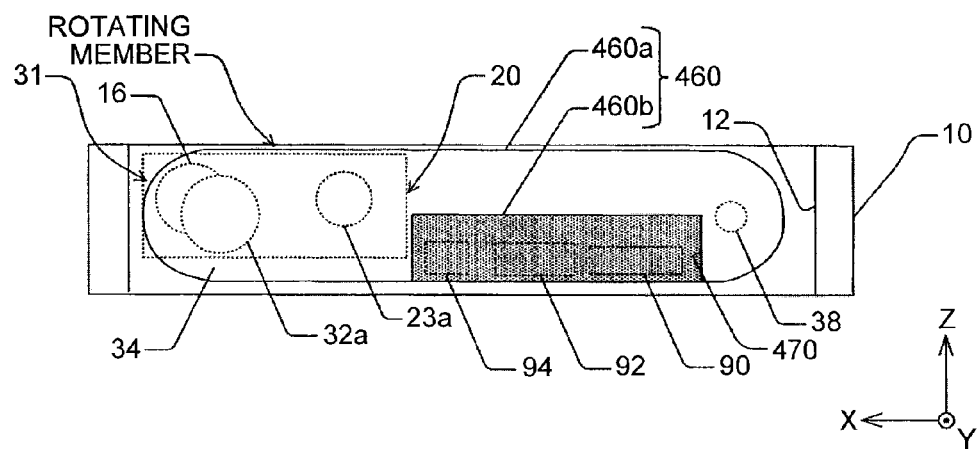
FIGS. 21A and 21B are a first view and a second view, respectively, for explaining a configuration of an arm of a video conference apparatus according to an eighth modification.
Figure 21B:
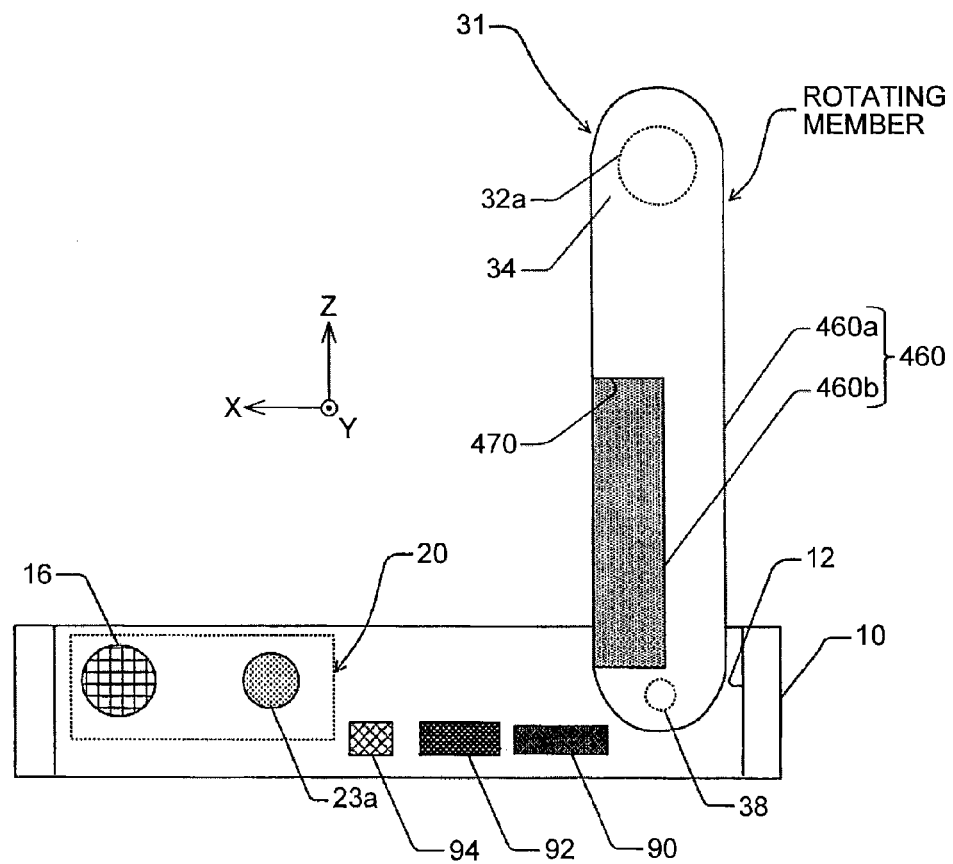

To address this, as illustrated in FIG. 21A and FIG. 21B, a portion of an arm 460 in the rotating member facing the three connectors (the image input terminal 90, the image output terminal 92, and the LAN terminal 94) is made more elastically deformable than the other portion in the eighth modification, for example.

In other words, the arm 460 includes a main body 460a and a connector covering portion 460b that is more elastically deformable than the main body 460a, for example.

The main body 460a is made of hard resin, such as a plastic and a metal, for example, and has a shape obtained by cutting out a rectangular portion facing the three connectors from the arm 36 according to the embodiment. In other words, a rectangular cut-out 470 is formed in the main body 460a. In this case, the stiffness required for the arm 460 can be sufficiently ensured only by the main body 460a, thereby preventing the arm 460 from deforming when the arm 460 is rotated, for example. A stiffening member may be provided in the arm 460 to further increase the stiffness.

The connector covering portion 460b is a rectangular plate member (an elastic body) made of soft resin, such as a rubber and urethane, and is bonded to the main body 460a in a manner fit into the cut-out 470 with an adhesive, for example. The main body 460a and the connector covering portion 460b may be integrally formed by a compound forming method for different materials, for example.

Figure 22A:
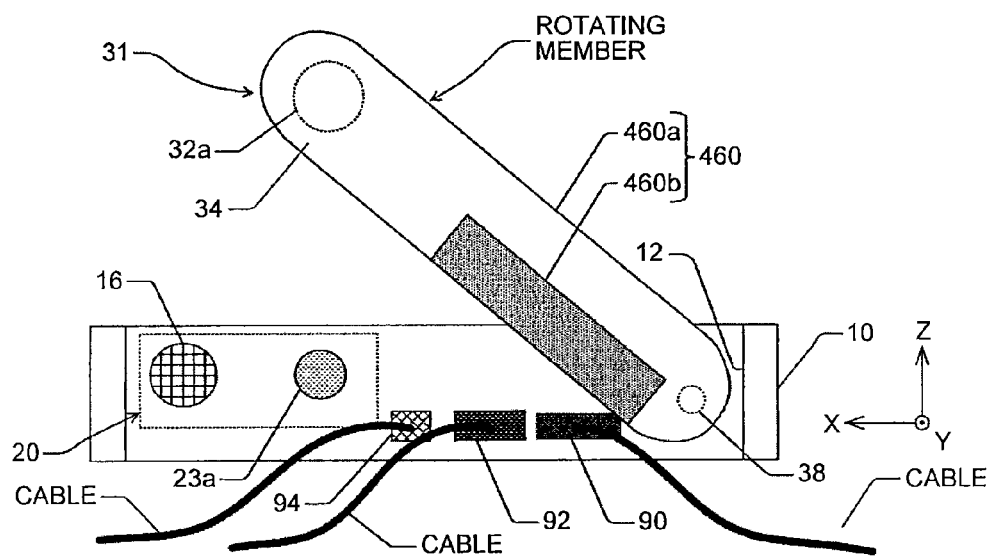
FIGS. 22A to 22C are a first view to a third view, respectively, for explaining an action performed by a connector covering unit when a rotating member is rotated from the exposing position to the covering position with a cable connected to each connector in the video conference apparatus according to the eighth modification.
Figure 22B:
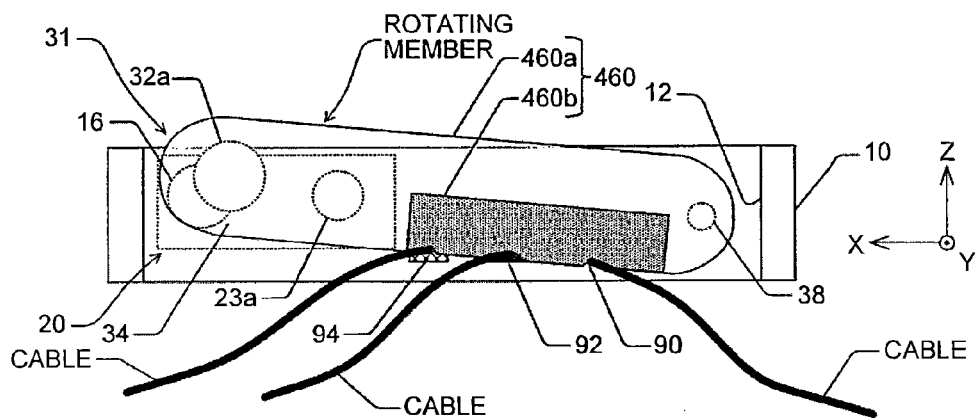
Figure 22C:
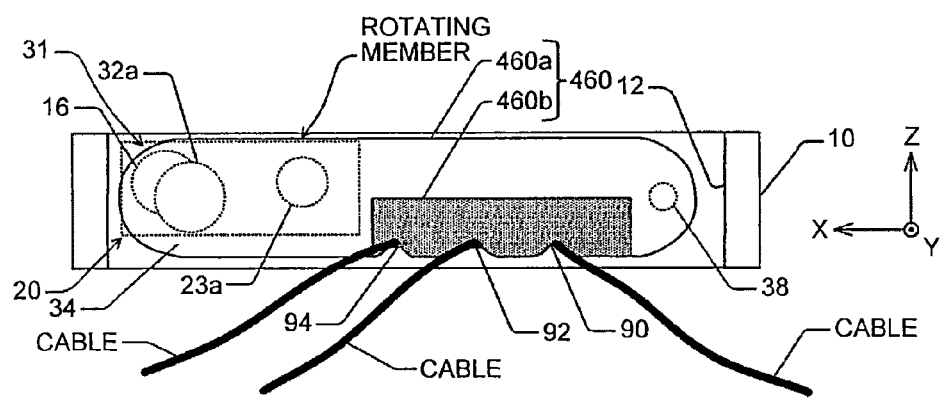

The hardness of the connector covering portion 460b is set such that, if cables are connected to the connectors and the rotating member is positioned at the covering position (refer to FIG. 22C), the bending radius of each of the cables is equal to or larger than the allowable bending radius.

If the cables are connected to the three connectors and the rotating member is rotated from the exposing position to the covering position (refer to FIG. 22A), for example, the connector covering portion 460b comes into contact with the cables. If the rotating member is further rotated toward the covering position, the drag between the connector covering portion 460b and the cables elastically deforms the connector covering portion 460b and bends the cables (refer to FIG. 22B). If the rotating member is positioned at the covering position, the elastic deformation amount of the connector covering portion 460b becomes the maximum, and the bending radius of each of the cables becomes the minimum (refer to FIG. 22C). At this time, because the bending radius of each of the cables is equal to or larger than the allowable bending radius, damage to the cables (e.g., electrical property degradation) can be prevented.

The cables connected to the connectors have different allowable bending radii depending on their thicknesses and materials, for example. Therefore, the hardness of the connector covering portion is preferably set as follows: if the cables are connected to the connectors and the rotating member is rotated from the exposing position to the covering position as described above, the minimum value of the bending radius of each of the cables is equal to or larger than the allowable bending radius of a cable whose allowable bending radius is the largest. The hardness of the connector covering portion and the cables can be measured by a hardness meter, such as a durometer. The material of the connector covering portion is preferably determined by considering abrasion resistance and heat resistance in addition to the mechanical strength.

In the eighth modification, if the rotating member is rotated from the exposing position to the covering position and the connector covering portion 460b comes into contact with the cables connected to the connectors, the connector covering portion 460b elastically deforms to prevent a bend of the cables. As a result, the cables can be prevented from being damaged.

In other words, the rotation range of the rotating member is not limited by the cables connected to the connectors, whereby it is possible to increase the flexibility of an electronic camera 32 in movement with respect to a housing 10.

Furthermore, the rotating member can be positioned at the covering position with the cables connected to the connectors. Thus, it is possible to cover an image capturing lens 32a, a projector lens 23a, the connectors, and other components from the outside. In other words, the video conference apparatus can be placed in a state where the cables are connected to the connectors and the image capturing lens 32a, the projector lens 23a, the connectors, and other components are protected.

In this case, it is possible to save attachment and detachment of the cables to and from the connectors at the start and the end of a conference. Furthermore, the video conference apparatus can be used as an audio conference apparatus, for example, by positioning the rotating member at the covering position.

The structure of the connector covering portion 460b can be changed as appropriate. The shape of the connector covering portion may be a shape other than a rectangle, for example. In this case, the shape of the cut-out formed in the arm preferably conforms to the shape of the connector covering portion. The connector covering portion may have a plurality of parts individually facing a plurality of connectors integrally or separately. Furthermore, a slit into which a cable is inserted may be formed at a portion corresponding to each of the connectors in the connector covering portion.

Ninth Modification

Figure 23:
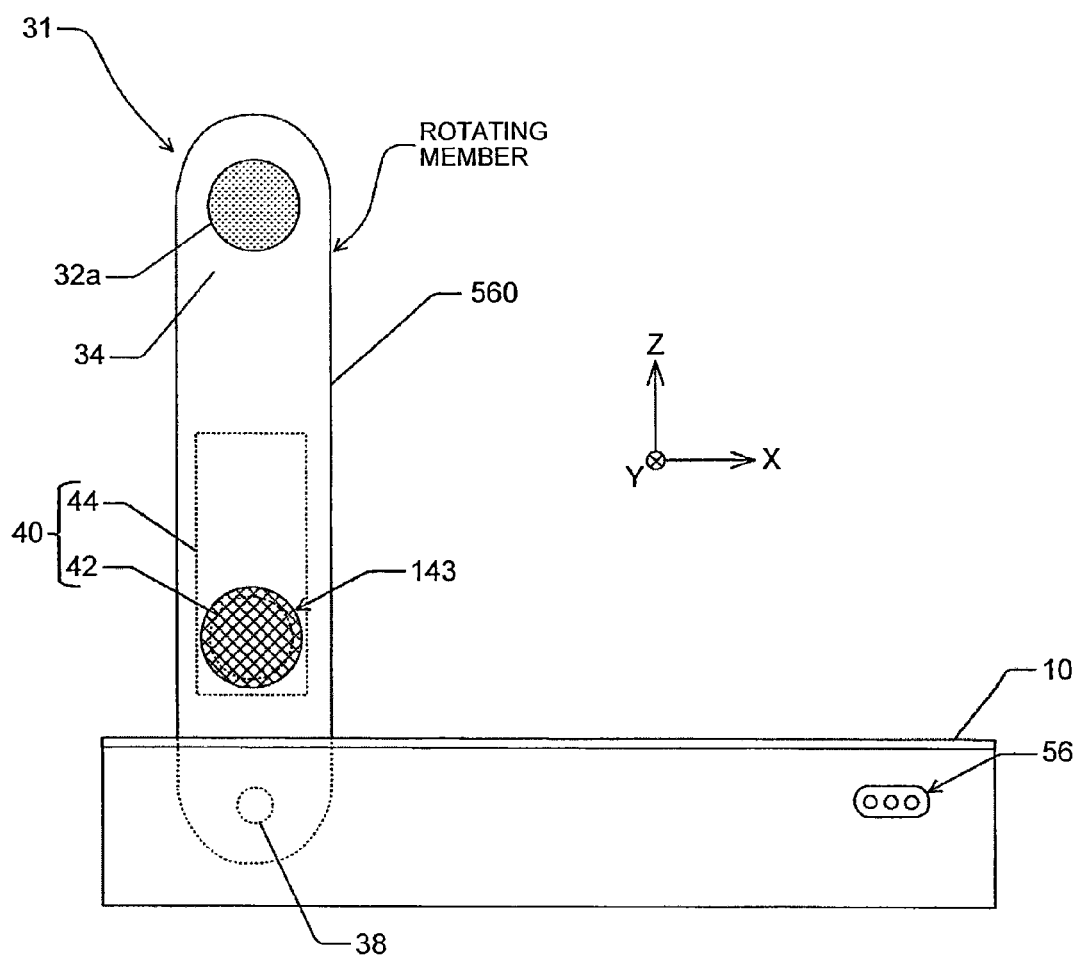
FIG. 23 is a view for explaining arrangement of a speaker in a video conference apparatus according to a ninth modification.

As illustrated in FIG. 23, a ninth modification is different from the embodiment in that an audio output device 40 including a speaker 42 and a speaker box 44 is embedded in an arm 560.

The speaker 42, for example, is arranged in the arm 560 as follows: if a rotating member is positioned at a position where the total rotation angle from the covering position falls within a range of 45 degrees to 135 degrees, the entire speaker 42 is positioned on the positive side in the Z-axis direction with respect to a housing 10, and the audio output direction is toward the negative side in the Y-axis direction.

An audio releasing port 143 is formed at a portion facing the speaker 42 in the wall on the negative side in the Y-axis direction of the arm 560. The audio releasing port 143 is composed of a plurality of through holes to release audio output from the speaker 42. Because the audio releasing port 143 is covered from the outside when the rotating member is positioned at the covering position, it is possible to prevent foreign materials from entering the arm 560 through the audio releasing port 143.

FIG. 24 illustrates sound pressure directivity of speakers according to a comparative example in which the audio output direction of a speaker is toward the positive side in the Z-axis direction and to the ninth modification. In the ninth modification, the audio output direction of the speaker 42 is toward the negative side (e.g., the negative side in the Y-axis direction). Thus, it is found that, especially when a plurality of members are present on the negative side (e.g., the negative side in the Y-axis direction) with respect to the video conference apparatus to conduct a conference (refer to FIG. 8), most of the members can readily hear the audio on the other end output from the speaker 42 compared with the comparative example (refer to FIG. 24).

In the ninth modification, the speaker 42 is arranged in the arm 560 as described above. Therefore, if the rotating member is positioned at the exposing position, the audio output direction of the speaker 42 can be toward the negative side in the Y-axis direction (e.g., toward a plurality of members' side), and the speaker 42 can be positioned at a height closer to ear levels of the members. As a result, the members can more readily hear the audio on the other end output from the speaker 42.

In the ninth modification, the speaker 42 is arranged in the arm 560 such that the audio output direction is toward the negative side in the Y-axis direction. Alternatively, the speaker 42 may be arranged in the arm such that the audio output direction is other than the negative side in the Y-axis direction. In this case, the audio releasing port is preferably formed at a position corresponding to the audio output direction of the speaker 42 in the arm.

While the speaker 42 is embedded in the arm 560 in the ninth embodiment, the speaker 42 may be externally attached to the arm.

Tenth Modification

Figure 25:
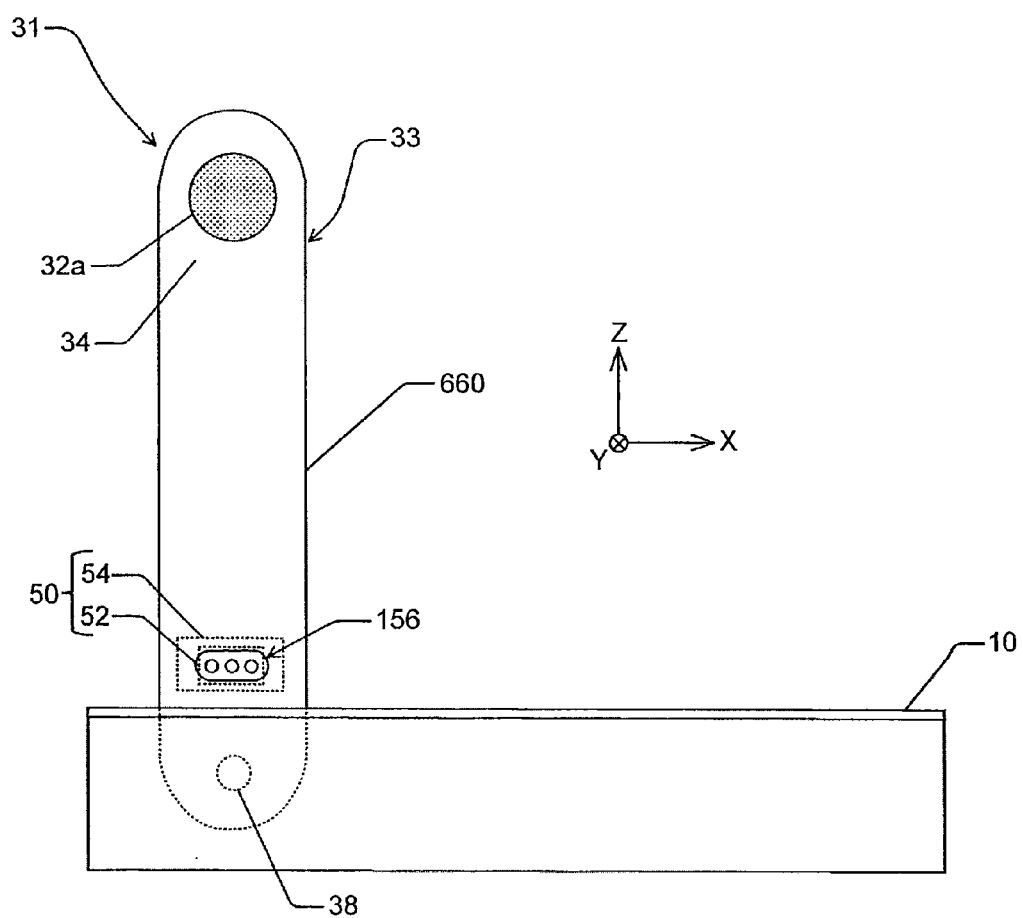
FIG. 25 is a view for explaining arrangement of a microphone in a video conference apparatus according to a tenth modification.

As illustrated in FIG. 25, a tenth modification is different from the embodiment in that an audio input device 50 including a microphone 52 and a holding member 54 is embedded in an arm 660.

The microphone 52, for example, is arranged in the arm 660 as follows: if a rotating member is positioned at a position where the total rotation angle from the covering position falls within a range of 45 degrees to 135 degrees, the entire microphone 52 is positioned on the positive side in the Z-axis direction with respect to a housing 10, and the audio input direction is toward the positive side in the Y-axis direction.

An audio receiving port 156 is formed at a portion facing the microphone 52 in the wall on the negative side in the Y-axis direction of the arm 660. The audio receiving port 156 is composed of a plurality of through holes to receive audio input through the microphone 52. Because the audio receiving port 156 is covered from the outside when the rotating member is positioned at the covering position, it is possible to prevent foreign materials from entering the arm 660 through the audio receiving port 156.

In the tenth modification, the microphone 52 is arranged in the arm 660 as described above. Therefore, if the rotating member is positioned at the exposing position, the audio input direction of the microphone 52 can be toward the positive side in the Y-axis direction (e.g., toward the side opposite to a plurality of members), and the microphone 52 can be positioned at a height closer to mouth levels of the members. As a result, audio from each of the members can be more readily received by the microphone 52.

In the tenth modification, the microphone 52 is arranged in the arm 660 such that the audio input direction is toward the positive side in the Y-axis direction. Alternatively, the microphone 52 may be arranged in the arm such that the audio input direction is toward the side other than the positive side in the Y-axis direction. In this case, the audio receiving port is preferably formed at a position corresponding to the audio input direction of the microphone 52 in the arm.

While the microphone 52 is embedded in the arm 660 in the tenth embodiment, the microphone 52 may be externally attached to the arm.

While the rotating member provided to be rotatable to the housing is used as the moving unit in the embodiment and the modifications, the moving unit is not limited thereto. A member provided to be slidable to the housing, that is, a member provided to be movable relatively with respect to the housing between the covering position and the exposing position may be used.

While the recess is formed in the housing, and the rotating member can be housed in the recess in the embodiment and the modifications, no recess may be formed in the housing, and the rotating member may be externally attached to the housing. In other words, the rotating member simply needs to be provided to be rotatable with respect to the housing between the covering position and the exposing position.

While the housing is provided with the projector lens, and the rotating member is provided with the image capturing lens in the embodiment and the modifications, the housing may be provided with the image capturing lens, and the rotating member may be provided with the projector lens. In this case, the housing may be provided with the electronic camera, and the rotating member may be provided with at least a part of the projector (e.g., the optical system), for example.

The configuration of the projector serving as a light projecting unit is not limited to those described in the embodiment and the modifications.

The number of laser diodes is not limited to three, for example. With one laser diode that outputs white light, for example, a color image may be formed by: separating the white light into light of three colors with a color separating unit, such as a color wheel; and synthesizing the light with a color synthesizing unit, such as a dichroic prism. Alternatively, a monochromatic image may be formed with one laser diode. In this case, no color separating unit or no color synthesizing unit is required.

Instead of the laser diode (semiconductor laser), a light source, such as another laser and a mercury lamp, may be used.

The optical system may include at least one LCD panel, a microlens array, a digital micromirror device (DMD), a light deflector, and a free-form surface mirror at a stage before the lens unit 23.

In the embodiment and the modifications, the inlet port 16 serving as a vent is provided on the surface defining the recess on the negative side in the Y-axis direction, and the inlet port 16 is exposed or covered in association with rotation of the rotating member. Instead of this configuration, an outlet port serving as a vent may be provided on the surface defining the recess on the negative side in the Y-axis direction, and the outlet port may be exposed or covered in association with rotation of the rotating member, for example. In this case, the inlet port simply needs to be provided at an appropriate position corresponding to the position of the outlet port.

The type and the number of terminals (connectors) mounted on the main board 62 are not limited to those described in the embodiment and the modifications and may be changed as appropriate.

While the housing 10 is formed in a rectangular shape in a planar view in the embodiment and the modifications, the shape of the housing 10 is not limited thereto. The housing 10 may be formed in another shape, such as a polygon in a planar view (except for a rectangle), a circle in a planar view, and an ellipse in a planar view.

While the video conference apparatus 1000 that can perform interactive communications (transmission and reception) of an image and audio has been explained as an example of the communication apparatus according to the present invention in the embodiment and the modifications, the communication apparatus is not limited thereto. In other words, the communication apparatus according to the present invention simply needs to be an apparatus used to share information via a communication network, such as a video conference and an audio conference.

While an image input from the electronic camera 32 (e.g., the figure of the user, a document, and an image) is transmitted to a video conference apparatus on the other end in the conference in the embodiment and the modifications, the image is not necessarily transmitted thereto. An image input from the electronic camera 32 (e.g., the figure of the user, a document, and an image) of a video conference apparatus may be projected onto a screen by the projector 20 of the video conference apparatus, for example.

While an image transmitted from a video conference apparatus on the other end in the conference is projected onto the screen by the projector 20 in the embodiment and the modifications, the image is not necessarily projected thereon. An image projected onto the screen by the projector 20 (e.g., the figure of the user, a document, and an image) may be input from the electronic camera 32, for example, and the image thus input may be transmitted to the video conference apparatus on the other end.

The communication apparatus according to the present invention can be applied to various uses in addition to those described above.

The embodiments can expose or cover a projector lens and an image capturing lens while saving labor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus used to share information via a communication network, the communication apparatus comprising:
    a housing;
    a moving unit provided to be movable relatively with respect to the housing;
    a light projecting unit that projects light modulated based on image information, is provided in one of the housing or the moving unit, and includes a projector lens; and
    an image input unit that is to input an image, is provided in the other of the housing or the moving unit, and includes an image capturing lens, wherein
    the moving unit is capable of moving relatively with respect to the housing between a covering position at which the projector lens and the image capturing lens are covered and an exposing position at which the projector lens and the image capturing lens are exposed.

2. The communication apparatus according to claim 1, wherein
    the light projecting unit is provided in the housing,
    the image input unit is provided in the moving unit, and
    the housing faces the image capturing lens and the moving unit faces the projector lens when the moving unit is positioned at the covering position.

3. The communication apparatus according to claim 2, further comprising a guiding mechanism that guides the moving unit to move closer to the projector lens in association with movement of the moving unit from the exposing position to the covering position.

4. The communication apparatus according to claim 2, wherein the moving unit is provided with a covering portion that covers a gap between the moving unit and the projector lens when the moving unit is positioned at the covering position.

5. The communication apparatus according to claim 2, further comprising a cleaning member provided in the housing or the moving unit so as to clean the projector lens or the image capturing lens in association with movement of the moving unit between the covering position and the exposing position.

6. The communication apparatus according to claim 2, further comprising:
    a connector provided on a side of the housing on which the projector lens is positioned, wherein
    the connector is covered by the moving unit when the moving unit is positioned at the covering position.

7. The communication apparatus according to claim 2, further comprising:
    a connector provided on a side of the housing on which the projector lens is positioned, wherein
    the connector is not covered by the moving unit when the moving unit is positioned at the covering position.

8. The communication apparatus according to claim 6, wherein a portion of the moving unit that covers the connector when the moving unit is positioned at the covering position is made of an elastic body.

9. The communication apparatus according to claim 2, further comprising:
    a cooling unit including a vent provided on a side of the housing on which the projector lens is provided, wherein
    the vent is covered when the moving unit is positioned at the covering position.

10. The communication apparatus according to claim 1, further comprising a microphone provided in the moving unit.

11. The communication apparatus according to claim 1, further comprising a speaker provided in the moving unit.

* * * * *